US012469996B2

United States Patent
Nakamura et al.

(10) Patent No.: US 12,469,996 B2
(45) Date of Patent: Nov. 11, 2025

(54) CONNECTOR AND CONNECTOR ASSEMBLY

(71) Applicant: JAPAN AVIATION ELECTRONICS INDUSTRY, LIMITED, Tokyo (JP)

(72) Inventors: Keisuke Nakamura, Tokyo (JP); Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 383 days.

(21) Appl. No.: 17/992,640

(22) Filed: Nov. 22, 2022

(65) Prior Publication Data

US 2023/0198181 A1  Jun. 22, 2023

(30) Foreign Application Priority Data

Dec. 22, 2021  (JP) ................. 2021-208548

(51) Int. Cl.
*H01R 12/71* (2011.01)
*H01R 12/52* (2011.01)

(52) U.S. Cl.
CPC .......... *H01R 12/716* (2013.01); *H01R 12/52* (2013.01)

(58) Field of Classification Search
CPC ...... H01R 12/716; H01R 12/52; H01R 13/41; H01R 13/11; H01R 12/73; H01R 13/631;
(Continued)

(56) References Cited

U.S. PATENT DOCUMENTS

2010/0159717 A1  6/2010 Takeuchi
2010/0330821 A1  12/2010 Takeuchi et al.
(Continued)

FOREIGN PATENT DOCUMENTS

JP  4555329 B2  7/2010
JP  5107811 B2  10/2012
(Continued)

OTHER PUBLICATIONS

Korean Office Action (and an English language translation thereof) dated Aug. 30, 2024, issued in counterpart Korean Application No. 10-2022-0163643.
(Continued)

*Primary Examiner* — Abdullah A Riyami
*Assistant Examiner* — Nelson R. Burgos-Guntin
(74) *Attorney, Agent, or Firm* — Holtz, Holtz & Volek PC

(57) ABSTRACT

A connector comprises a plurality of terminals and a housing. The housing has an interposing portion extends in an up-down direction. The interposing portion has a first side portion and a second side portion in a width direction perpendicular to the up-down direction. Each of the terminals has an insertion end portion and a second extending portion. The second side portion has an allowance portion and a restriction portion. The allowance portion is nearer to the insertion end portion than the restriction portion in the up-down direction. The connector has a gap between the allowance portion and the second extending portion in the width direction. The allowance portion allows partial movement of the second extending portion into the gap. The restriction portion is in contact with the second extending portion in the width direction without any gap and thereby restricts movement of the second extending portion in the width direction.

9 Claims, 20 Drawing Sheets

(58) Field of Classification Search
CPC ........ H01R 13/02; H01R 13/40; H01R 13/62; H01R 24/00; H01R 13/2407; H01R 13/629
See application file for complete search history.

(56) References Cited

U.S. PATENT DOCUMENTS

| | | | | |
|---|---|---|---|---|
| 2011/0111648 | A1* | 5/2011 | Takeuchi | H01R 12/716 439/884 |
| 2014/0378000 | A1 | 12/2014 | Miyazaki | |
| 2016/0268715 | A1* | 9/2016 | Kodaira | H01R 43/0256 |
| 2019/0074622 | A1* | 3/2019 | Takenaga | H01R 12/716 |

FOREIGN PATENT DOCUMENTS

| | | | |
|---|---|---|---|
| JP | 5553502 | B2 | 6/2014 |
| JP | 2016152083 | A | 8/2016 |
| JP | 6241712 | B2 | 11/2017 |
| JP | 2019046670 | A | 3/2019 |

OTHER PUBLICATIONS

Japanese Office Action (and an English language translation thereof) dated Aug. 20, 2025, issued in counterpart Japanese Application No. 2021-208548.

* cited by examiner

CONNECTOR AND CONNECTOR ASSEMBLY

CROSS REFERENCE TO RELATED APPLICATIONS

This application is based on and claims priority under 35 U.S.C. § 119 to Japanese Patent Application No. JP2021-208548 filed Dec. 22, 2021, the contents of which are incorporated herein in their entirety by reference.

BACKGROUND OF THE INVENTION

This invention relates to a connector which is mateable with a mating connector, and to a connector assembly which comprises the connector and the mating connector.

A connector of this type is disclosed in JP-B 5553502 (Patent Document 1), for example.

As shown in FIG. 40, a second connector 900, or a connector 900, of Patent Document 1 is mateable in a Z-direction with a first connector 950, or a mating connector 950. The connector 900 comprises a second housing 910, or a housing 910, and second terminals 920, or terminals 920. The terminals 920 are held by the housing 910. Each of the terminals 920 has a first contact portion 922, or a first contact point 922, and an extending portion 923. The extending portion 923 is provided with a contact protrusion 924, or a lock portion 924, and a second contact portion 926, or a second contact point 926. The mating connector 950 comprises a first housing 960, or a mating housing 960, and first terminals 970, or mating terminals 970. The mating terminals 970 are held by the mating housing 960. Each of the mating terminals 970 has a first contact portion 972, or a main contact point 972, and a second contact portion 976, or a support contact point 976. When the connector 900 and the mating connector 950 are mated with each other, the first contact point 922 of the terminal 920 is connected with the main contact point 972 of the mating terminal 970 while the second contact point 926 of the terminal 920 is connected with the support contact point 976 of the mating terminal 970. In addition, when the connector 900 and the mating connector 950 are mated with each other, the lock portion 924 of the terminal 920 is engaged with the support contact point 976 of the mating terminal 970. In other words, the support contact point 976 of the mating terminal 970 also functions as a mating lock portion which is configured to be engaged with the lock portion 924.

A great insertion force upon mating of a connector with a mating connector might damage a terminal of the connector and/or a housing of the connector, for example. Accordingly, there is a requirement to reduce an insertion force upon mating of a connector with a mating connector.

On the other hand, from a point of view of electrical reliability, it is desirable that a terminal of a connector is brought into contact with a mating terminal of a mating connector as designed under a mated state where the connector and the mating connector are mated with each other.

SUMMARY OF THE INVENTION

It is therefore an object of the present invention to provide a connector which requires a reduced insertion force upon mating of the connector with a mating connector and which enables a terminal of the connector to make electrical contact with a mating terminal of the mating connector as designed under a mated state where the connector is mated with the mating connector.

In the mating connector 970 of Patent Document 1, the main contact point 972 is supported by a spring which is softer than another spring supporting the support contact point 976. Accordingly, a force, with which the support contact point 976 pushes the terminal 920, is greater than a force with which the main contact point 972 pushes the terminal 920. In particular, the mating connector 950 of Patent Document 1 is configured so that the support contact point 976 also functions as the mating lock portion. Accordingly, the contact protrusion 924 of the terminal 920 receives a great reaction force when the contact protrusion 924 rides over the support contact point 976, and thereby the connector 900 has a drawback to require an increased insertion force upon the mating of the connector 900 with the mating connector 950.

In order to solve this drawback, the terminal 920 should be configured to be resiliently deformable so that, upon insertion of the connector 900 into the mating connector 950, a difference between the force, which is applied to the terminal 920 from the support contact point 976, and the force applied to the terminal 920 from the main contact point 972 is reduced. Specifically, this drawback can be solved by providing a gap between the extending portion 923, which is provided with the second contact point 926, and the housing 910 so that the extending portion 923 is resiliently deformable.

On the other hands, making the extending portion 923 of the terminal 920 resiliently deformable causes a new problem that a position of the second contact point 926 in an X-direction might be unstable. In order to solve the new problem, the inventors of the present application have conceived that a positive Z-side part of the extending portion 923 is intentionally brought into contact with the housing 910 so that the second contact point 926 is positioned in the X-direction with a high degree of accuracy. The present invention stems from the conceiving as described above.

One aspect (first aspect) of the present invention provides a connector mateable in an up-down direction with a mating connector which has a mating terminal. The connector comprises a plurality of terminals and a housing. The housing holds the terminals. The housing has an interposing portion extends in the up-down direction. The interposing portion has a first side portion and a second side portion in a width direction perpendicular to the up-down direction. Each of the terminals has an insertion end portion, a first extending portion and a second extending portion. The insertion end portion has a U-like shape. Each of the first extending portion and the second extending portion extends in the up-down direction from the insertion end portion. The interposing portion is positioned between the first extending portion and the second extending portion in the width direction. The first extending portion is provided with a first contact point. The first contact point is brought into contact with the mating terminal when the connector is mated with the mating connector. The second extending portion is provided with a second contact point. The second contact point is brought into contact with the mating terminal when the connector is mated with the mating connector. The first side portion is in contact with the first extending portion. The second side portion has an allowance portion and a restriction portion. The allowance portion is nearer to the insertion end portion than the restriction portion in the up-down direction. The connector has a gap between the allowance portion and the second extending portion in the width direction. The allowance portion allows partial movement of the second extending portion into the gap. The restriction portion is in contact with the second extending portion in the width direction without any gap and thereby restricts movement of the second extending portion in the width direction.

Another aspect (second aspect) of the present invention provides a connector assembly comprising the connector of the first aspect and the mating connector which is mateable with the connector in the up-down direction. The mating connector comprises a plurality of the mating terminals and a mating housing. The mating housing holds the mating terminals. Each of the mating terminals has a mating restricted portion, a coupling portion, a support contact point, a supporting portion and a main contact point. Movement of the mating restricted portion in the width direction is restricted by the mating housing. The coupling portion extends from the mating restricted portion. The support contact point is supported by the coupling portion. The supporting portion extends from the support contact point and is at least partially resiliently deformable. The main contact point is supported by the supporting portion. The first contact point is brought into contact with the main contact point when the connector is mated with the mating connector. The second contact point is brought into contact with the support contact point when the connector is mated with the mating connector.

The connector of the present invention is configured as follows: the connector has the gap between the allowance portion and the second extending portion in the width direction; and the allowance portion allows the partial movement of the second extending portion into the gap. Accordingly, the connector of the present invention requires a reduced insertion force upon the mating of the connector with the mating connector.

Further, in the connector of the present invention, the restriction portion is in contact with the second extending portion in the width direction without any gap and thereby restricts the movement of the second extending portion in the width direction. Accordingly, in the connector of the present invention, the second contact point of the terminal of the connector can be positioned relative to the mating terminal of the mating connector with a high degree of accuracy. Thus, the connector of the present invention is configured so that a designed contact force between the mating terminal and the second contact point is obtained under a mated state where the connector is mated with the mating connector.

That is, the connector of the present invention requires the reduced insertion force upon the mating of the connector with the mating connector, and the connector of the present invention enables the terminal of the connector to make electrical contact with the mating terminal of the mating connector as designed under the mated state where the connector is mated with the mating connector.

An appreciation of the objectives of the present invention and a more complete understanding of its structure may be had by studying the following description of the preferred embodiment and by referring to the accompanying drawings.

Figure 1:
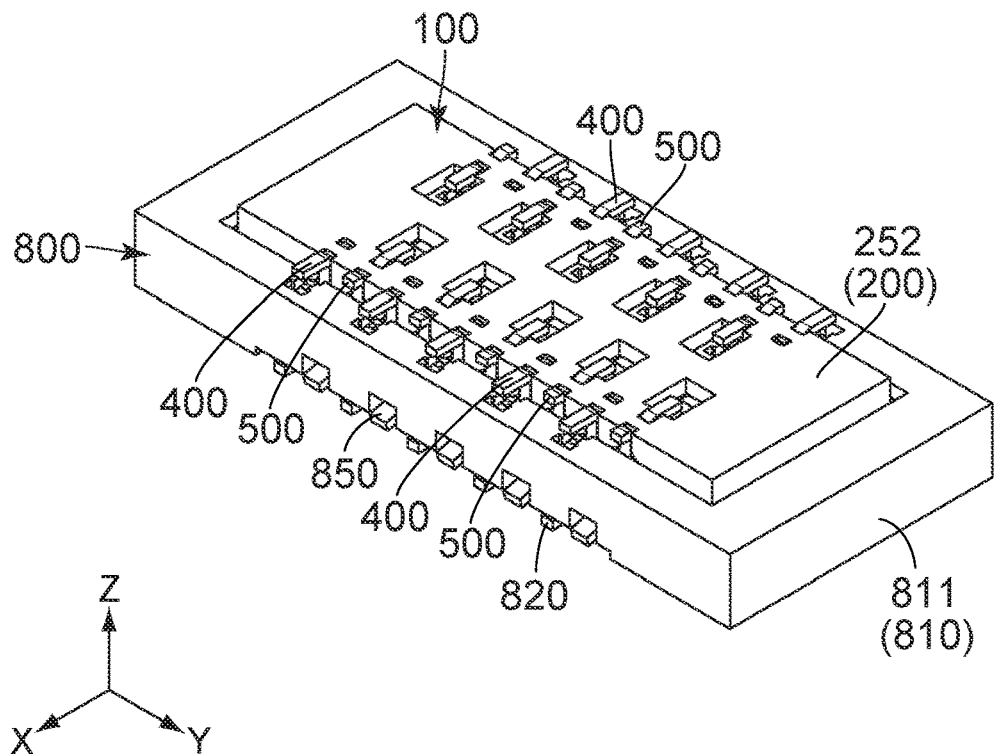
FIG. 1 is a perspective view showing a connector assembly according to an embodiment of the present invention. In the figure, a connector and a mating connector are in a mated state where the connector and the mating connector are mated with each other.
Figure 2:
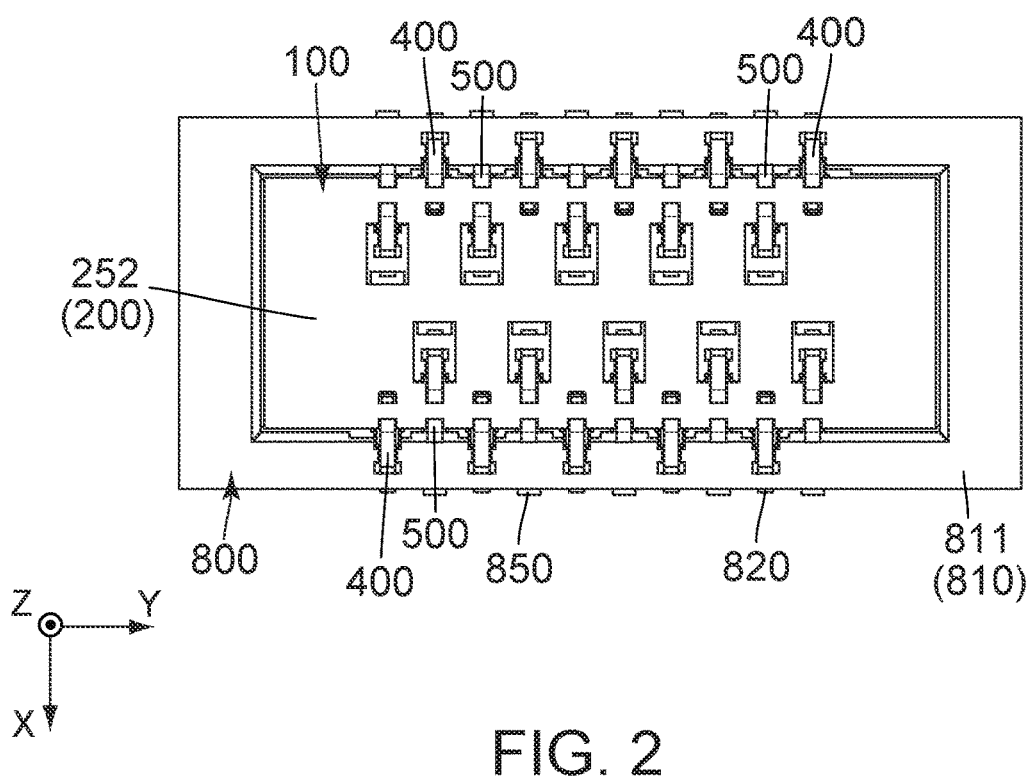
FIG. 2 is a top view showing the connector assembly of FIG. 1.
Figure 3:
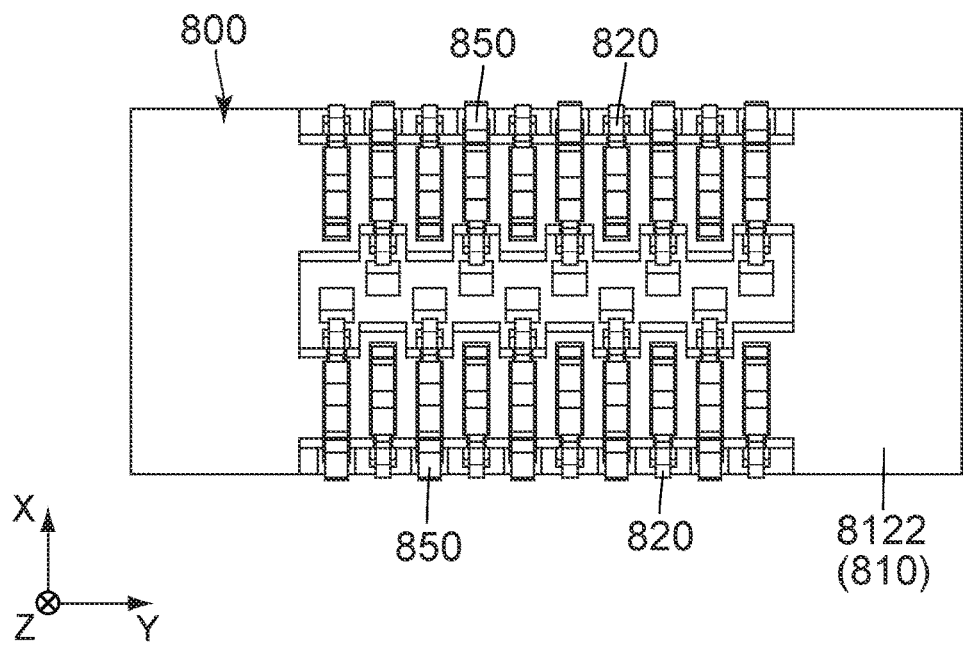
FIG. 3 is a bottom view showing the connector assembly of FIG. 1.
Figure 4:
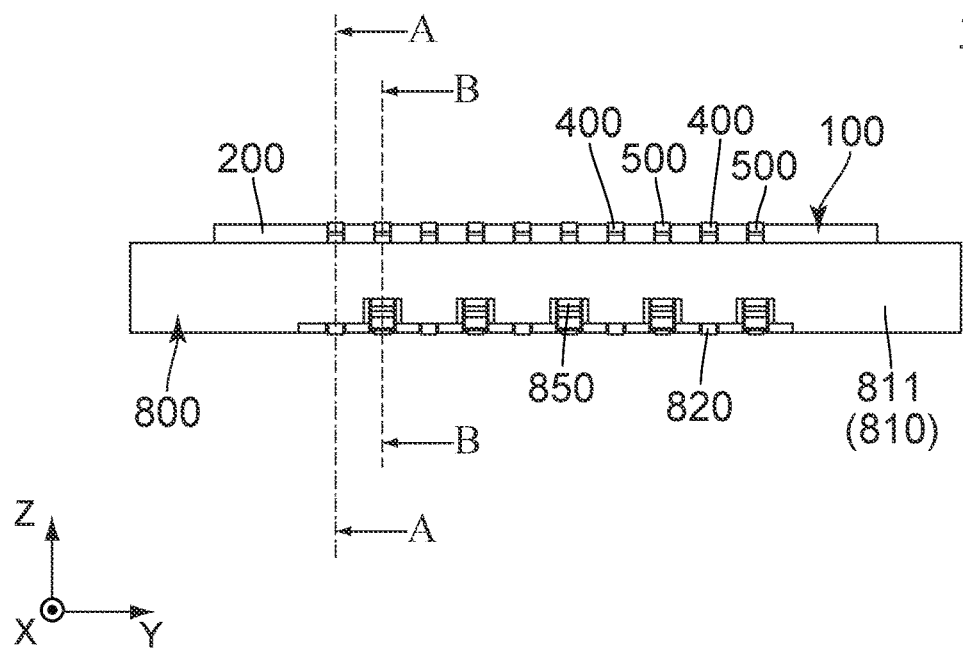
FIG. 4 is a front view showing the connector assembly of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As shown in FIG. 1, a connector assembly 10 according to an embodiment of the present invention comprises a connector 100 and a mating connector 800.

Figure 7:
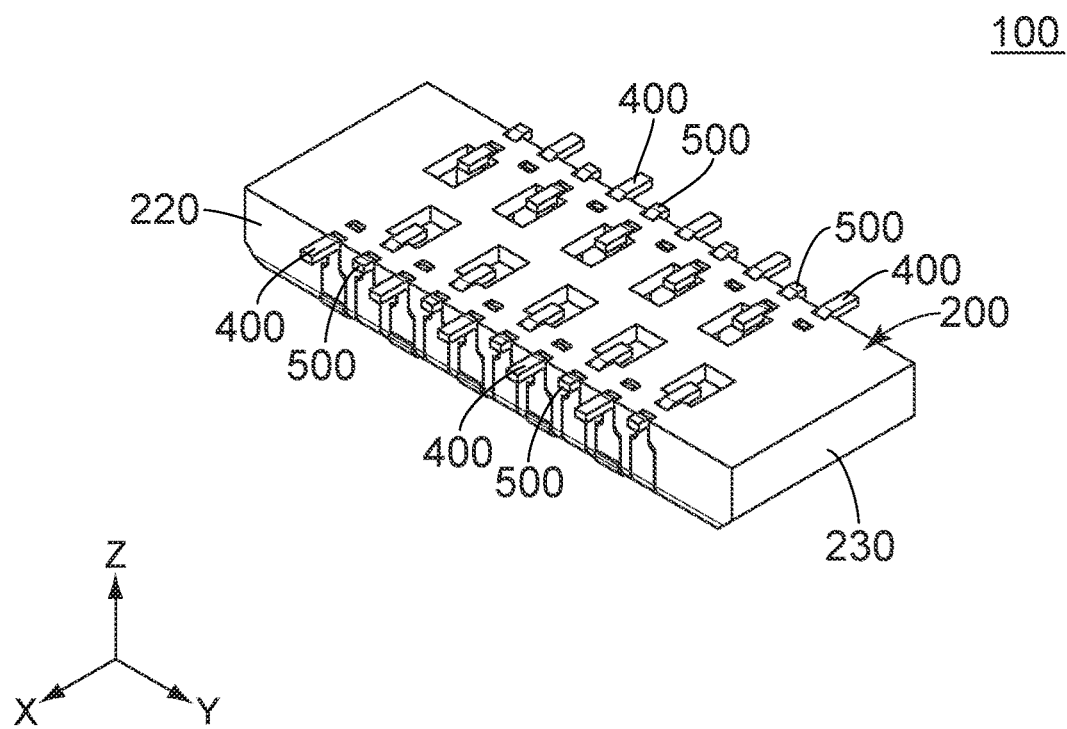
FIG. 7 is a perspective view showing the connector which is included in the connector assembly of FIG. 1.
Figure 27:
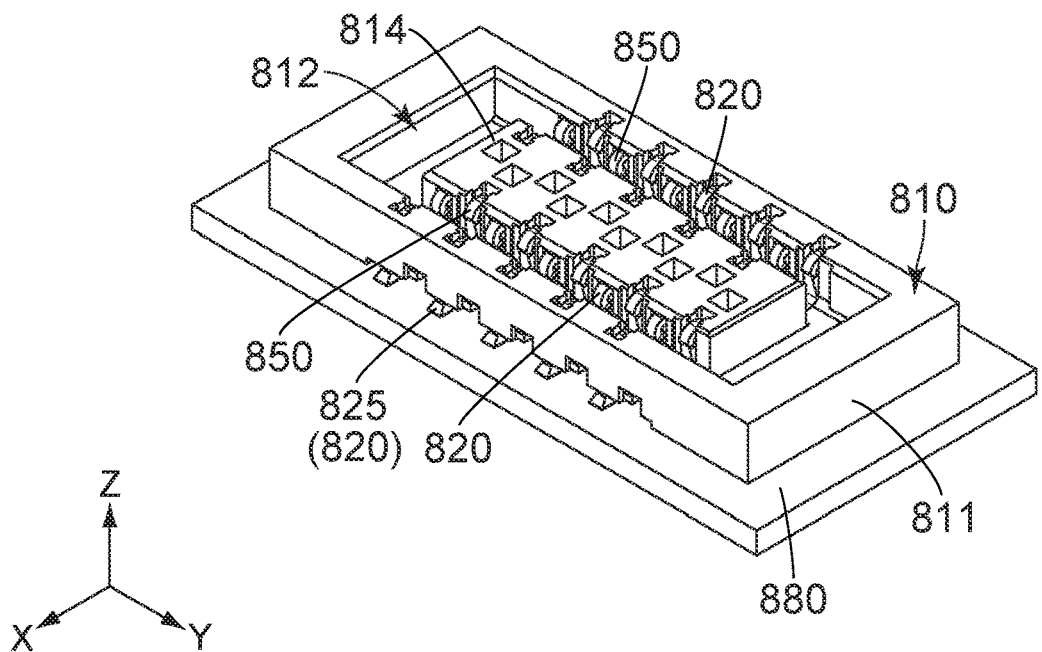
FIG. 27 is a perspective view showing the mating connector which is included in the connector assembly of FIG. 1. In the figure, the mating connector is mounted on a circuit board.

Referring to FIG. 27, the mating connector 800 of the present embodiment is configured to be mounted on a circuit board 880 which has pads (not shown) on its surface. As understood from FIGS. 1, 7 and 27, the mating connector 800 of the present embodiment is mateable with the connector 100 in an up-down direction. In the present embodiment, the up-down direction is a Z-direction. Specifically, it is assumed that upward is a positive Z-direction while downward is a negative Z-direction.

Figure 28:
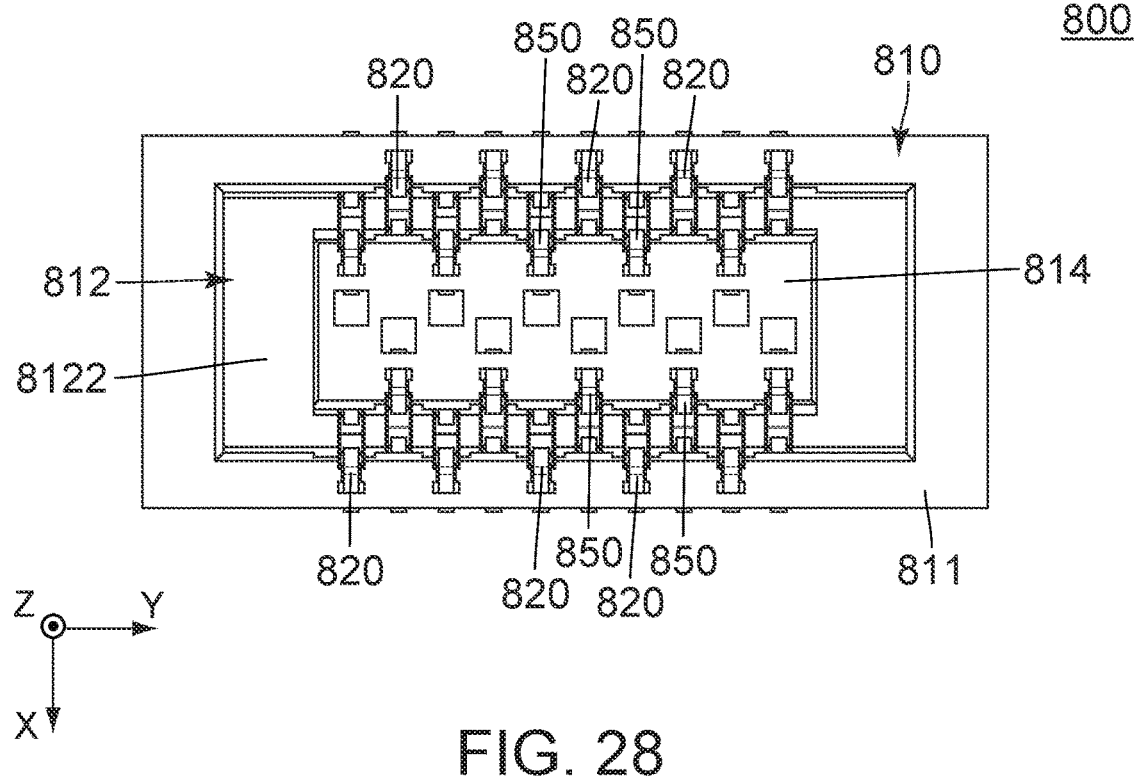
FIG. 28 is a top view showing the mating connector of FIG. 27.

As shown in FIG. 28, the mating connector 800 of the present embodiment comprises a plurality of mating terminals 820, 850 and a mating housing 810.

Figure 30:
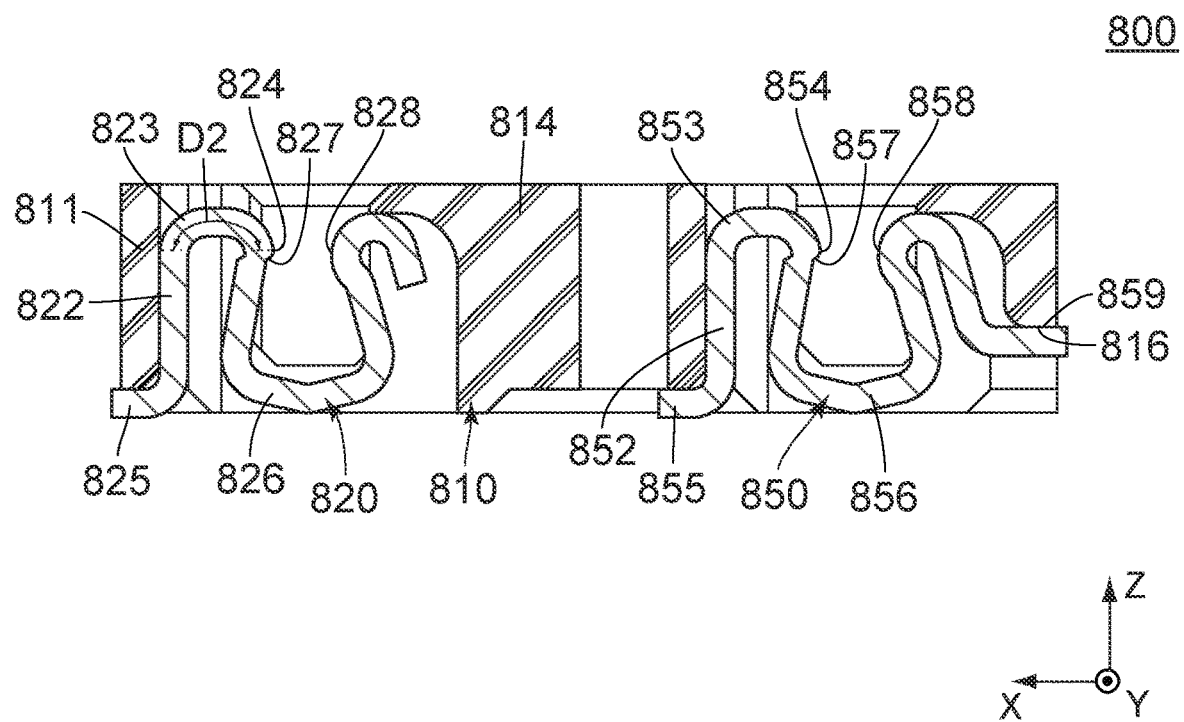
FIG. 30 is a cross-sectional view showing the mating connector of FIG. 29, taken along line G-G.

Referring to FIG. 28, the mating housing 810 of the present embodiment is made of insulator. The mating housing 810 holds the mating terminals 820, 850. As shown in FIGS. 28 and 30, the mating housing 810 has a surrounding portion 811, a mating surrounding portion accommodating portion 812, an island-like portion 814 and regulating portions 816.

Figure 29:
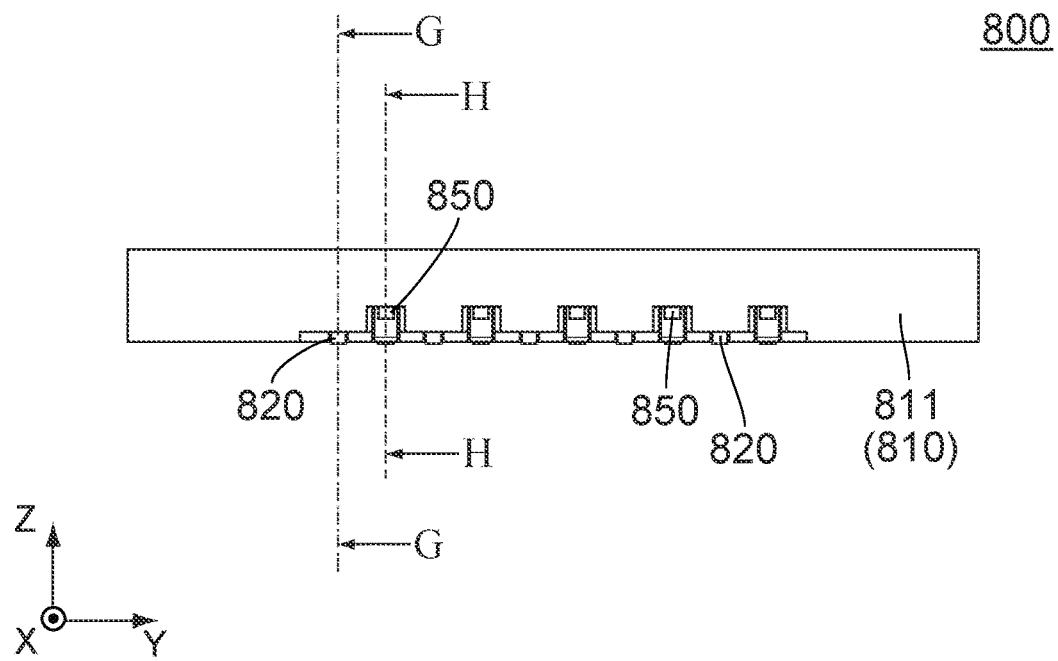
FIG. 29 is a front view showing the mating connector of FIG. 27.

As understood from FIGS. 28 and 29, the surrounding portion 811 of the present embodiment has a substantially rectangular tube shape extending in the up-down direction. The surrounding portion 811 defines outer ends of the mating housing 810 in a width direction perpendicular to the up-down direction. In the present embodiment, the width direction is an X-direction. The width direction is also referred to as a front-rear direction. Specifically, it is assumed that forward is a positive X-direction while rearward is a negative X-direction. The surrounding portion 811 defines outer ends of the mating housing 810 in a pitch direction perpendicular to both the up-down direction and the width direction. In the present embodiment, the pitch direction is a Y-direction.

As shown in FIGS. 27 and 28, the mating surrounding portion accommodating portion 812 of the present embodiment is surrounded by the surrounding portion 811 in a plane perpendicular to the up-down direction. The mating surrounding portion accommodating portion 812 is a recess which is recessed downward in the up-down direction. Specifically, the mating surrounding portion accommodating portion 812 has a lower surface 8122. The lower surface 8122 defines a lower end of the mating surrounding portion accommodating portion 812.

As understood from FIGS. 27 and 28, the island-like portion 814 of the present embodiment protrudes upward in the up-down direction from the lower surface 8122. The island-like portion 814 is surrounded by the mating surrounding portion accommodating portion 812 in the plane perpendicular to the up-down direction.

Figure 31:
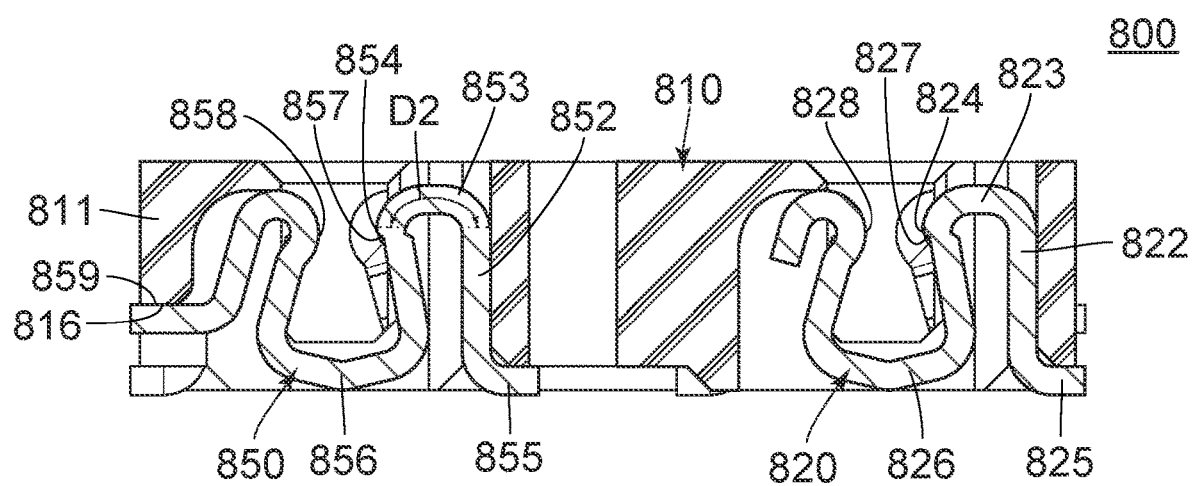
FIG. 31 is a cross-sectional view showing the mating connector of FIG. 29, taken along line H-H.

As shown in FIGS. 30 and 31, each of the regulating portions 816 of the present embodiment is positioned at the outer end of the mating housing 810 in the width direction.

Figure 32:
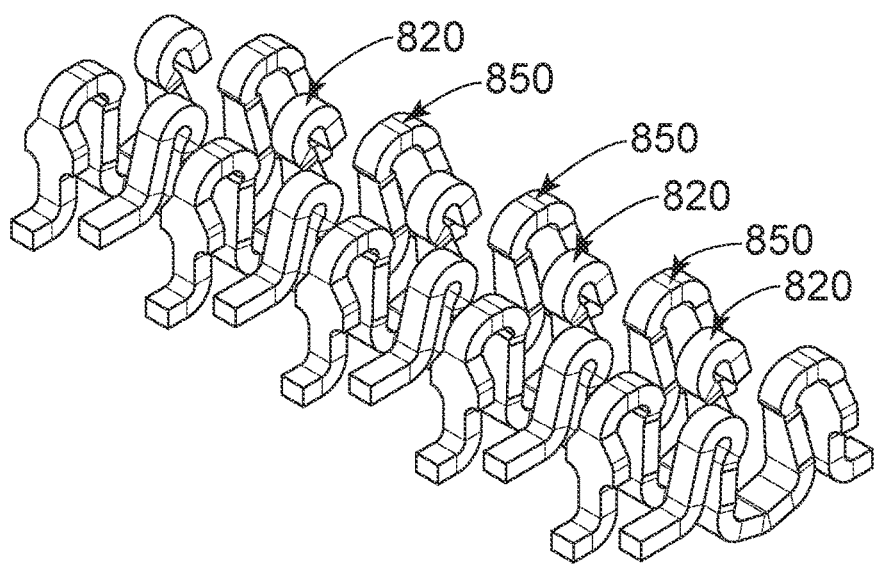
FIG. 32 is a perspective view showing one of mating terminal rows which are included in the mating connector of FIG. 27.
Figure 33:
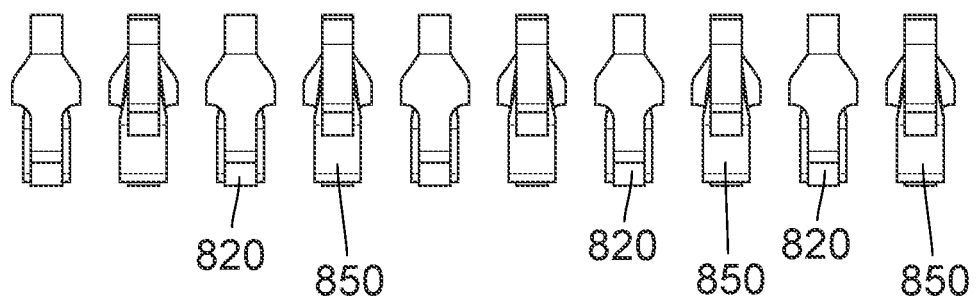
FIG. 33 is a front view showing the mating terminal row of FIG. 32.
Figure 34:
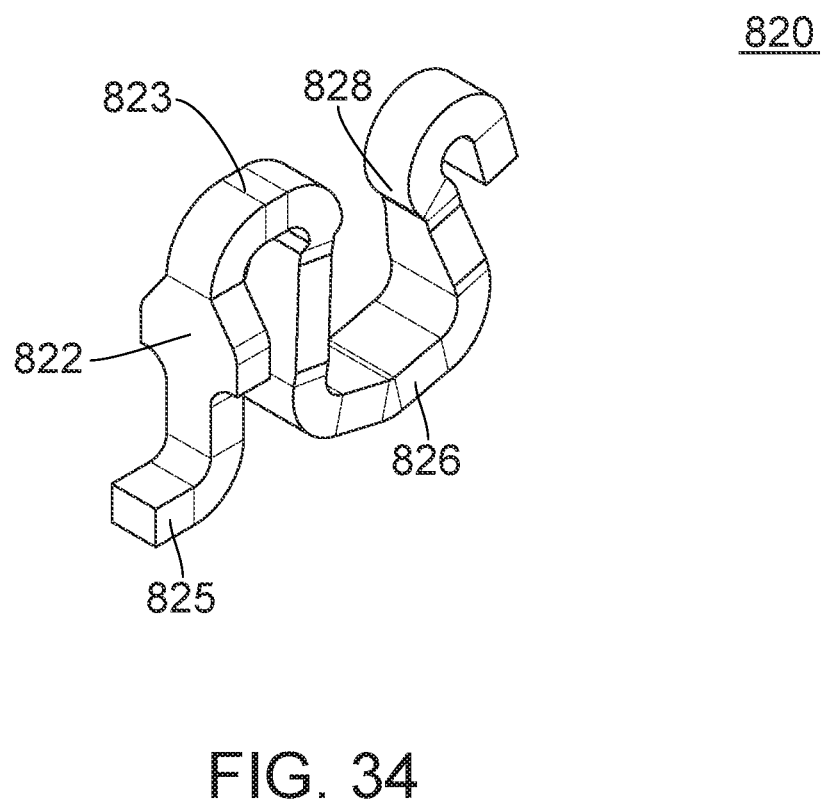
FIG. 34 is a perspective view showing a mating first terminal which is included in the mating terminal row of FIG. 32.
Figure 35:
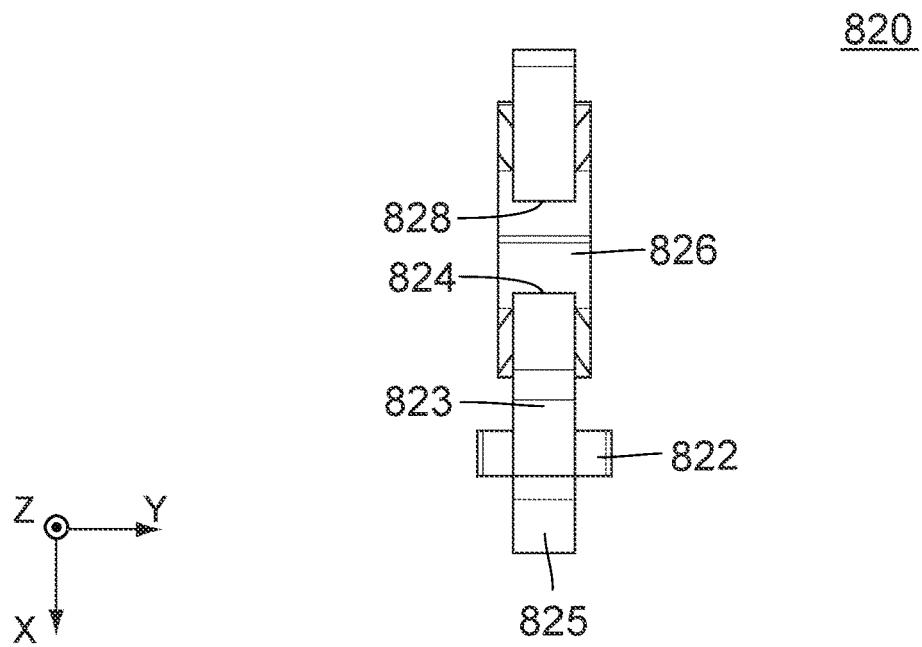
FIG. 35 is a top view showing the mating first terminal of FIG. 34.

Referring to FIG. 32, each of the mating terminals 820, 850 of the present embodiment is made of metal. As shown in FIG. 28, the mating terminals 820, 850 are arranged in two rows, namely, a front row and a rear row, in the width direction. The mating terminals 820, 850 of each row are arranged in the pitch direction. The mating terminals 820, 850 include mating first terminals 820 and mating second terminals 850.

Figure 36:
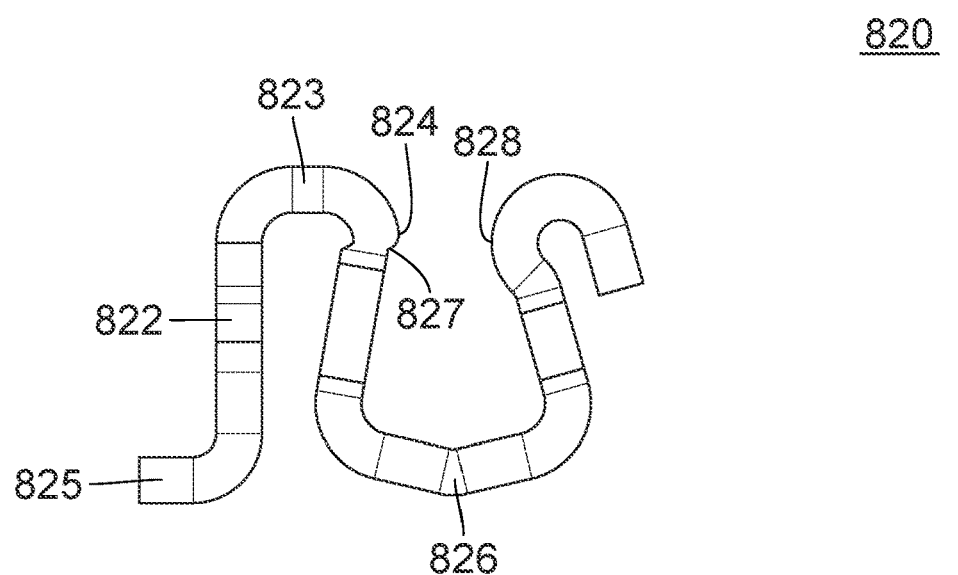
FIG. 36 is a side view showing the mating first terminal of FIG. 34.
Figure 37:
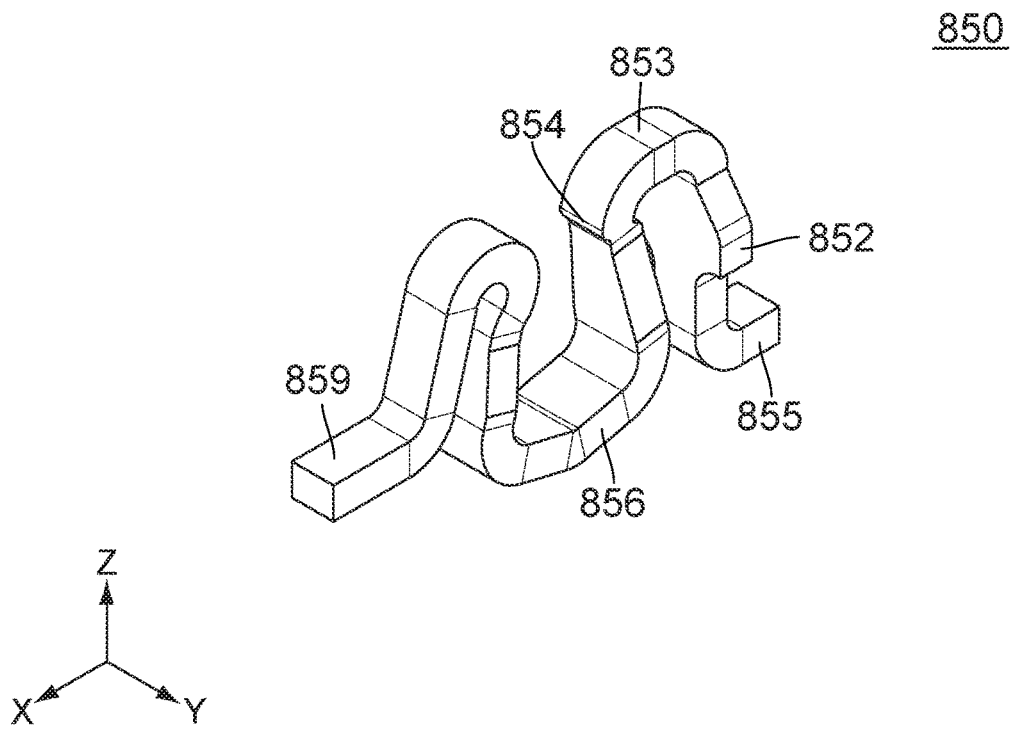
FIG. 37 is a perspective view showing a mating second terminal which is included in the mating terminal row of FIG. 32.
Figure 38:
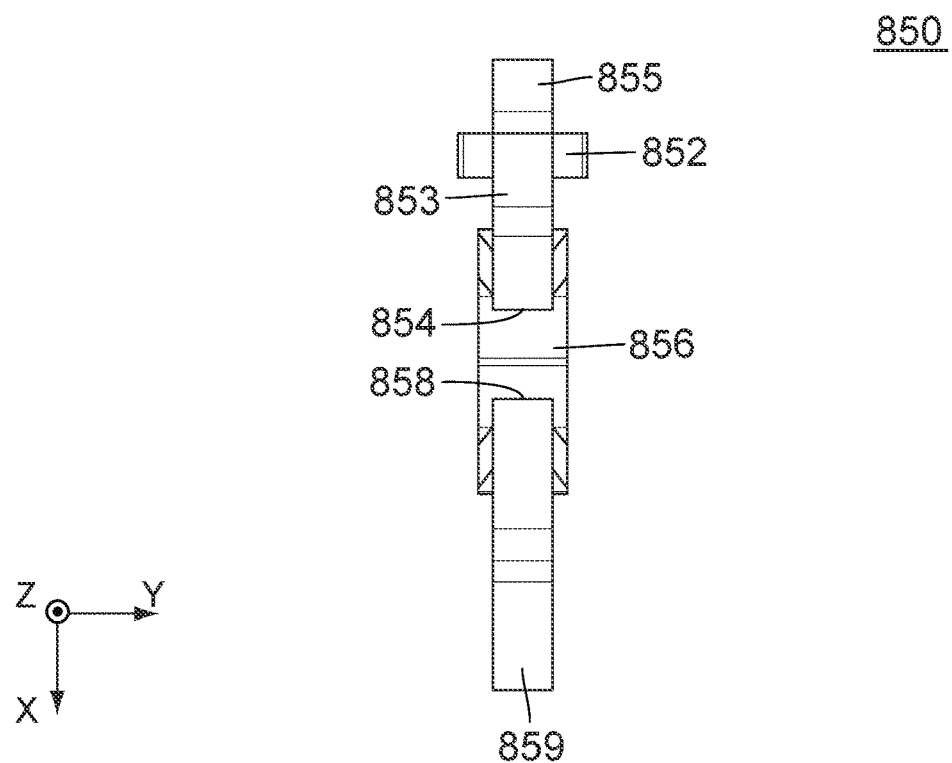
FIG. 38 is a top view showing the mating second terminal of FIG. 37.

As shown in FIG. 36, each of the mating first terminals 820 of the present embodiment has a mating restricted portion 822, a coupling portion 823, a support contact point 824, a mating lock portion 827, a supporting portion 826 and a main contact point 828. The mating restricted portion 822 is also referred to as a mating first restricted portion 822. The coupling portion 823 is also referred to as a first coupling portion 823. The support contact point 824 is also referred to as a first support contact point 824. The mating lock portion 827 is also referred to as a mating first lock portion 827. The supporting portion 826 is also referred to as a first supporting portion 826. The main contact point 828 is also referred to as a first main contact point 828.

As shown in FIG. 36, the mating restricted portion 822 of the present embodiment extends in the up-down direction. As shown in FIG. 30, movement of the mating restricted portion 822 in the width direction is restricted by the mating housing 810. Specifically, the mating restricted portion 822 is press-fit into the mating housing 810.

As shown in FIG. 36, the coupling portion 823 of the present embodiment extends from the mating restricted portion 822. More specifically, the coupling portion 823 extends inward in the width direction from the mating restricted portion 822 and is bent so that it extends downward in the up-down direction.

As shown in FIG. 36, the support contact point 824 of the present embodiment faces inward in the width direction. The support contact point 824 is supported by the coupling portion 823.

Referring to FIG. 36, the supporting portion 826 of the present embodiment extends from the support contact point 824 and is at least partially resiliently deformable. The supporting portion 826 extends downward in the up-down direction and outward in the width direction from the support contact point 824, and is bent so that it extends inward in the width direction, and is further bent so that it extends upward in the up-down direction and outward in the width direction.

As shown in FIG. 36, the main contact point 828 of the present embodiment faces outward in the width direction. The main contact point 828 is supported by the supporting portion 826.

As shown in FIG. 36, each of the mating first terminals 820 has a mating mounting portion 825. The mating mounting portion 825 is also referred to as a mating first mounting portion 825.

As shown in FIG. 36, the mating mounting portion 825 of the present embodiment extends outward in the width direction from the mating restricted portion 822. The mating mounting portion 825 defines an outer end of the mating first terminal 820 in the width direction. The mating mounting portion 825 defines a lower end of the mating first terminal 820 in the up-down direction. The mating mounting portion 825 is soldered to the pad when the mating connector 800 is mounted on the circuit board 880 shown in FIG. 27.

Figure 39:
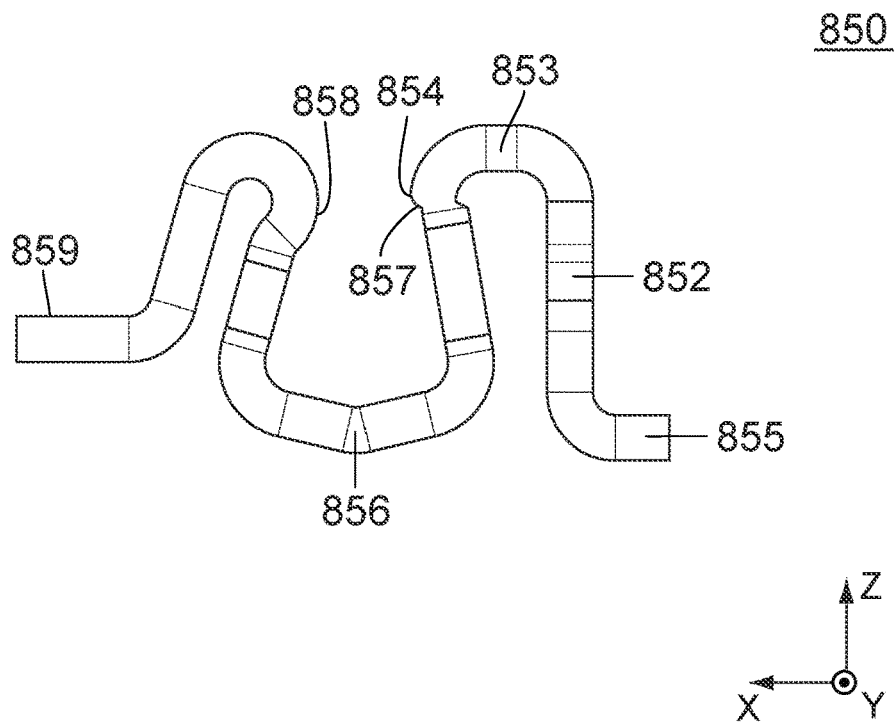
FIG. 39 is a side view showing the mating second terminal of FIG. 37.
Figure 40:
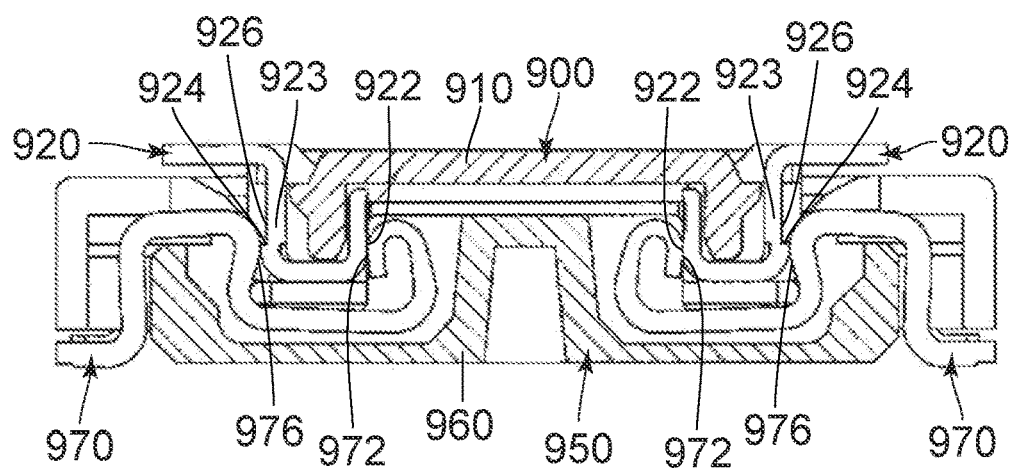
FIG. 40 is a cross-sectional view showing a first connector and a second connector of Patent Document 1.

As shown in FIG. 39, each of the mating second terminals 850 of the present embodiment has a mating restricted portion 852, a coupling portion 853, a support contact point 854, a mating lock portion 857, a supporting portion 856 and a main contact point 858 and a regulated portion 859. However, the present invention is not limited thereto, but the mating second terminal 850 may have no regulated portion 859. The mating restricted portion 852 is also referred to as a mating second restricted portion 852. The coupling portion 853 is also referred to as a second coupling portion 853. The support contact point 854 is also referred to as a second support contact point 854. The mating lock portion 857 is also referred to as a mating second lock portion 857. The supporting portion 856 is also referred to as a second supporting portion 856. The main contact point 858 is also referred to as a second main contact point 858.

As shown in FIG. 39, the mating restricted portion 852 of the present embodiment extends in the up-down direction. As shown in FIG. 31, movement of the mating restricted portion 852 in the width direction is restricted by the mating housing 810. Specifically, the mating restricted portion 852 is press-fit into the mating housing 810.

As shown in FIG. 39, the coupling portion 853 of the present embodiment extends from the mating restricted portion 852. More specifically, the coupling portion 853 extends inward in the width direction from the mating restricted portion 852 and is bent so that it extends downward in the up-down direction.

As shown in FIG. 39, the support contact point 854 of the present embodiment faces outward in the width direction. The support contact point 854 is supported by the coupling portion 853.

Referring to FIG. 39, the supporting portion 856 of the present embodiment extends from the support contact point 854 and is at least partially resiliently deformable. The supporting portion 856 extends downward in the up-down direction and inward in the width direction from the support contact point 854, and is bent so that it extends outward in the width direction, and is further bent so that it extends upward in the up-down direction and inward in the width direction.

As shown in FIG. 39, the main contact point 858 of the present embodiment faces inward in the width direction. The main contact point 858 is supported by the supporting portion 856.

As shown in FIG. 39, the regulated portion 859 of the present embodiment is coupled with the supporting portion 856 in the width direction. The regulated portion 859 defines an outer end of the mating second terminal 850 in the width direction. As shown in FIG. 31, the regulated portion 859 is positioned below the regulating portion 816 in the up-down direction. Upward movement of the regulated portion 859 in the up-down direction is regulated by the regulating portion 816.

As shown in FIG. 39, each of the mating second terminals 850 has a mating mounting portion 855. The mating mounting portion 855 is also referred to as a mating second mounting portion 855.

As shown in FIG. 39, the mating mounting portion 855 of the present embodiment extends inward in the width direction from the mating restricted portion 852. The mating mounting portion 855 defines an inner end of the mating second terminal 850 in the width direction. The mating mounting portion 855 defines a lower end of the mating second terminal 850 in the up-down direction. The mating mounting portion 855 is soldered to the pad when the mating connector 800 is mounted on the circuit board 880 shown in FIG. 27.

Figure 8:
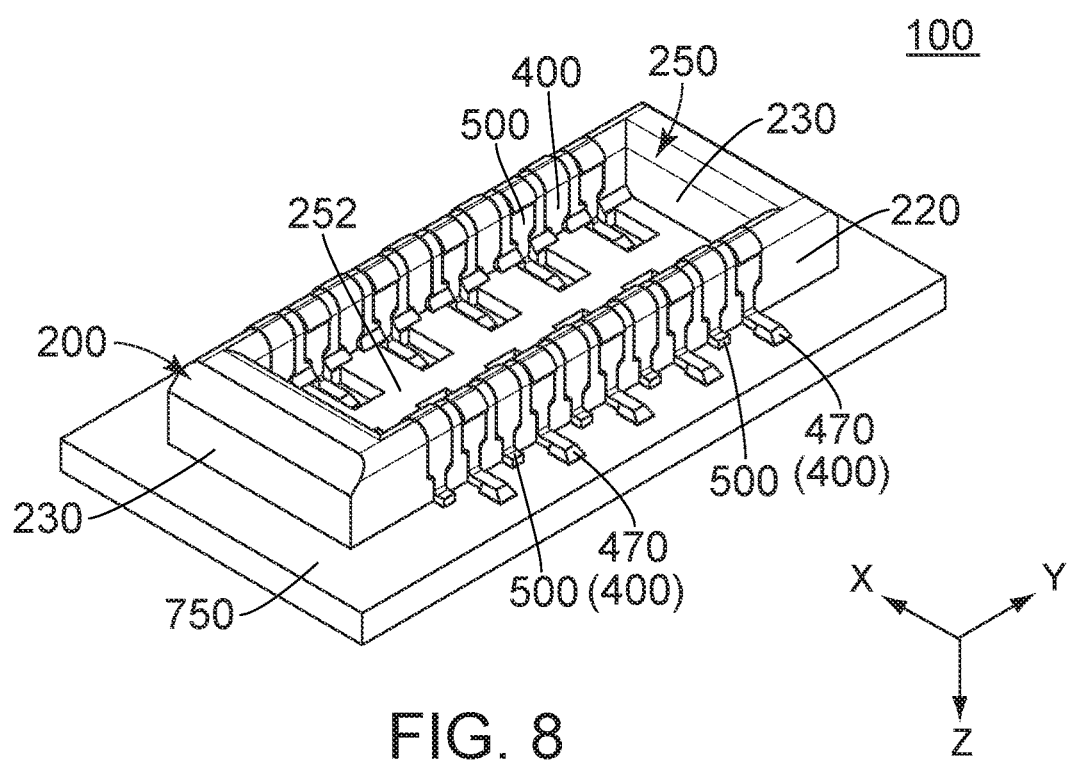
FIG. 8 is another perspective view showing the connector of FIG. 7. In the figure, the connector is mounted on a circuit board.
Figure 9:
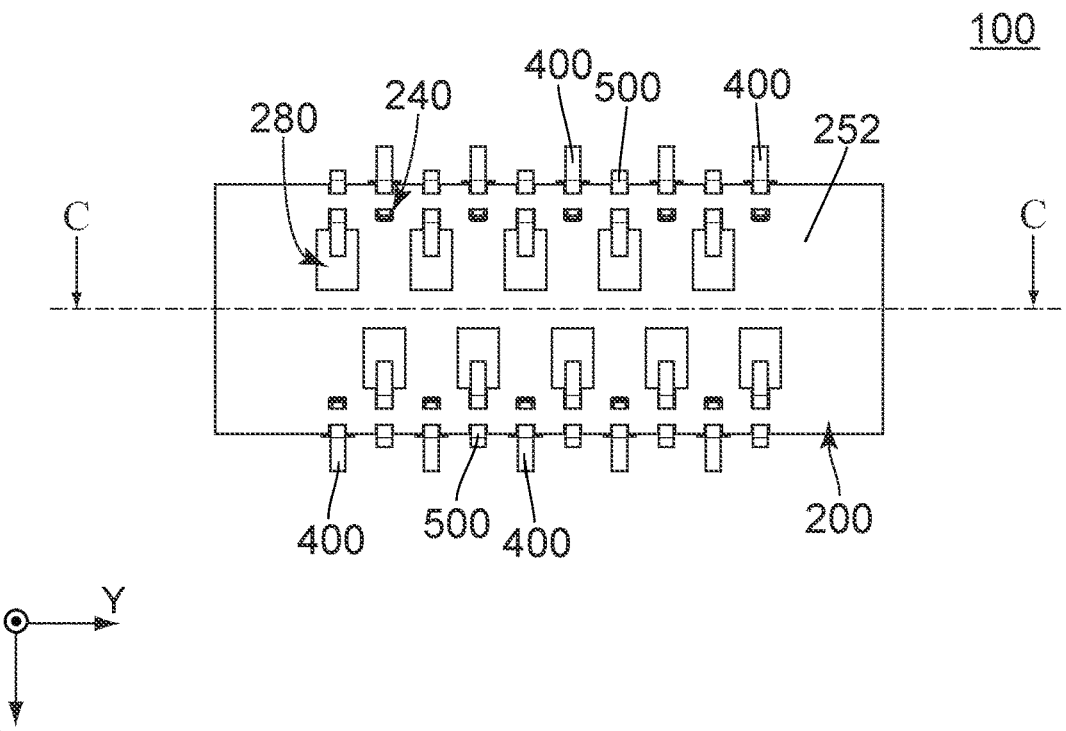
FIG. 9 is a top view showing the connector of FIG. 7.

Referring to FIG. 8, the connector 100 of the present embodiment is configured to be mounted on a circuit board 750 which has pads (not shown) on its surface. As understood from FIGS. 1, 7 and 27, the connector 100 of the present embodiment is mateable in the up-down direction with the mating connector 800 which has the mating terminals 820, 850.

As shown in FIG. 8, the connector 100 comprises a plurality of terminals 400, 500 and a housing 200.

Figure 11:
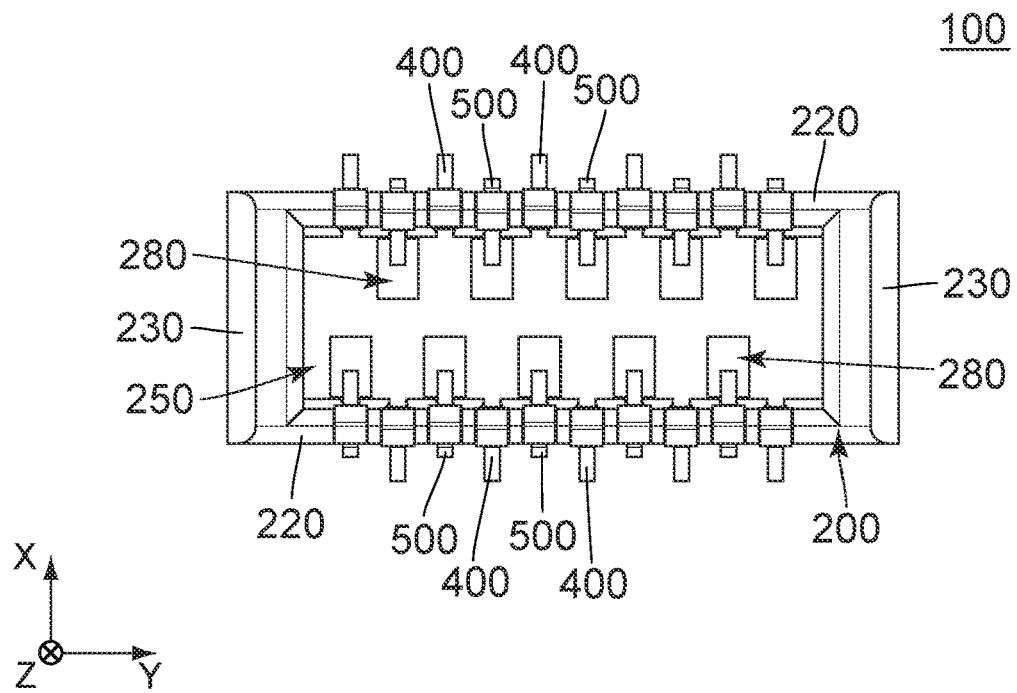
FIG. 11 is a bottom view showing the connector of FIG. 7.
Figure 15:
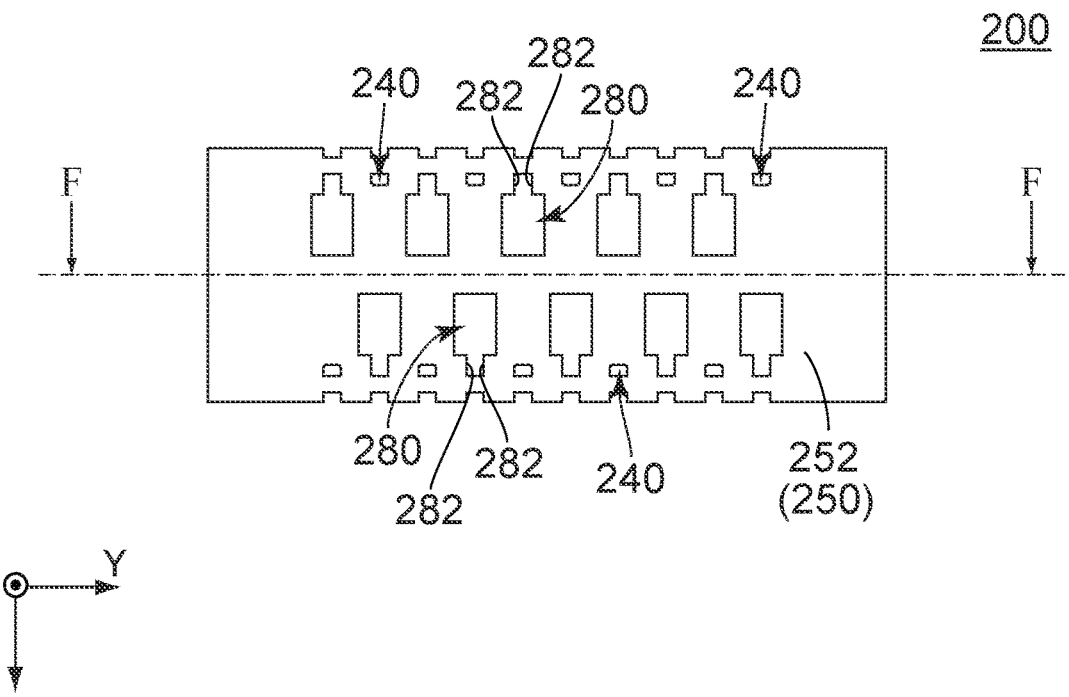
FIG. 15 is a top view showing a housing which is included in the connector of FIG. 9.

Referring to FIG. 15, the housing 200 of the present embodiment is made of insulator. As shown in FIG. 11, the housing 200 holds the terminals 400, 500. The housing 200 has two long wall portions 220, two short wall portions 230 and an island-like portion accommodating portion 250. However, the present invention is not limited thereto, but the number of the long wall portion 220 may be one.

Figure 16:
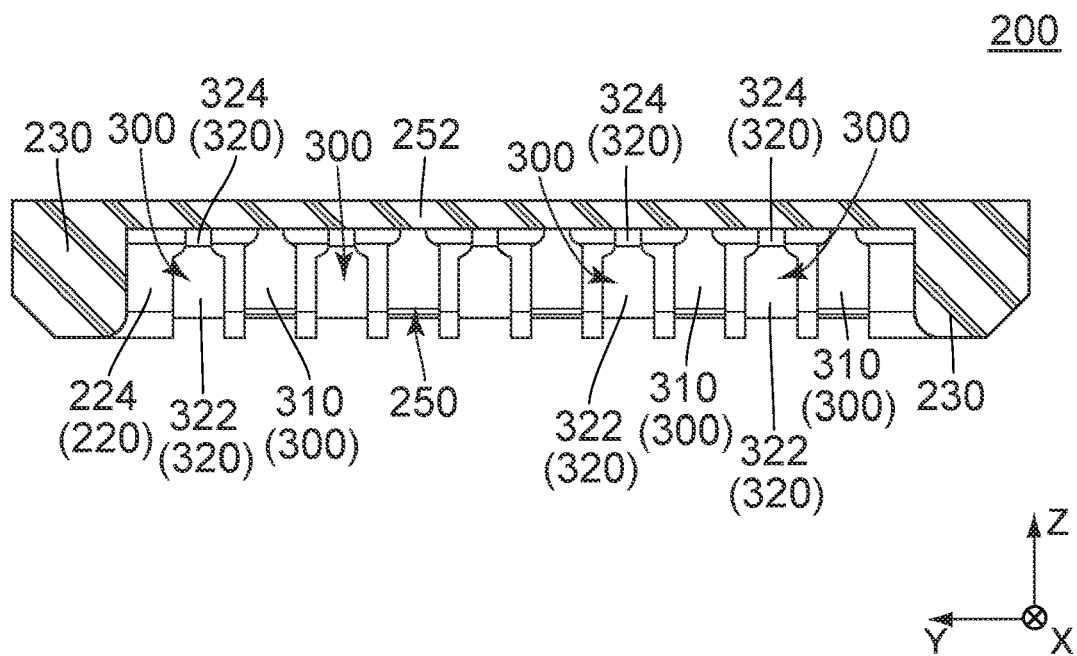
FIG. 16 is a cross-sectional view showing the housing of FIG. 15, taken along line F-F.
Figure 17:
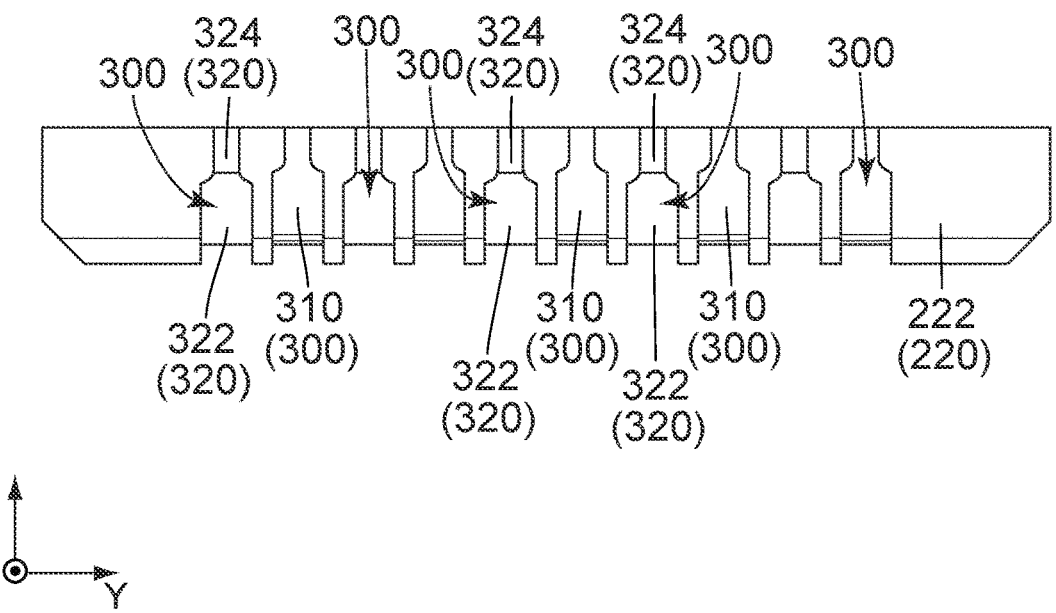
FIG. 17 is a front view showing the housing of FIG. 15.

Referring to FIG. 11, each of the long wall portions 220 of the present embodiment defines an outer end of the housing 200 in the width direction. Referring to FIG. 17, each of the long wall portions 220 has a height in the up-down direction and extends in the pitch direction perpendicular to both the up-down direction and the width direction. As shown in FIG. 11, each of the long wall portions 220 couples the two short wall portions 230 with each other in the pitch direction. Referring to FIGS. 16 and 17, each of the long wall portions 220 has a first wall surface 222 and a second wall surface 224.

As shown in FIG. 17, each of the long wall portions 220 is formed with a plurality of interposing portions 300. Specifically, the housing 200 has the interposing portions 300 each extending in the up-down direction.

As shown in FIGS. 16 and 17, each of the interposing portions 300 of the present embodiment has a first side portion 310 and a second side portion 320 in the width direction perpendicular to the up-down direction.

Figure 13:
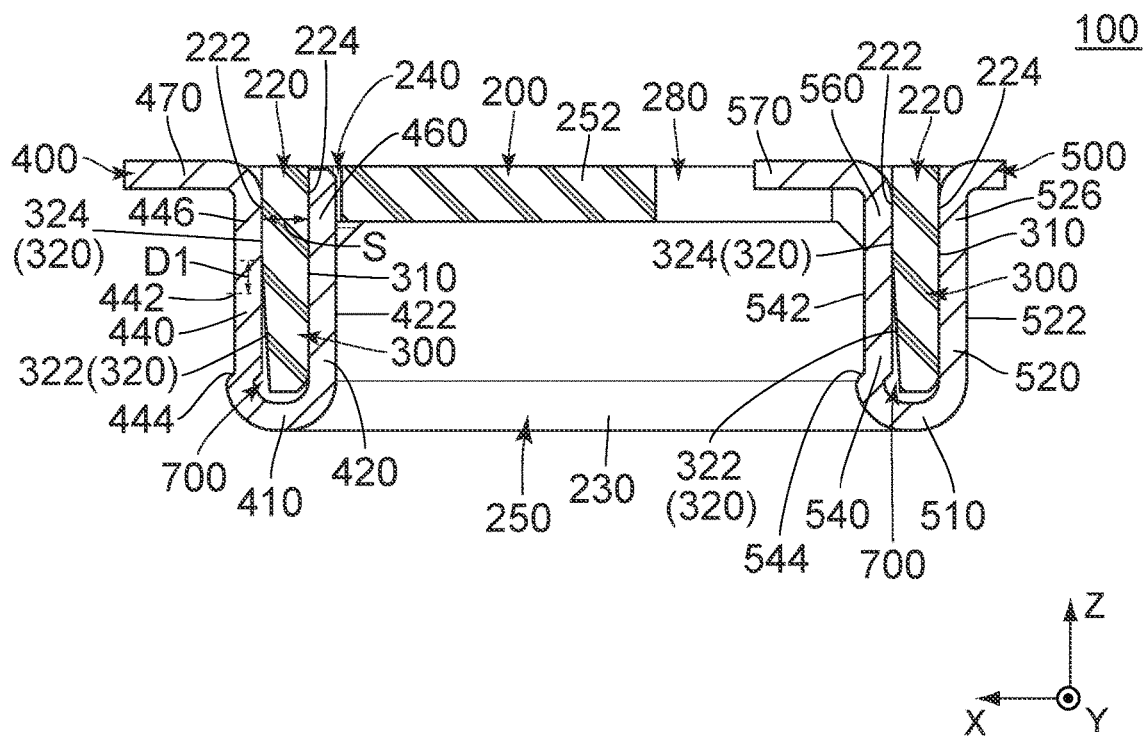
FIG. 13 is a cross-sectional view showing the connector of FIG. 12, taken along line D-D.
Figure 14:
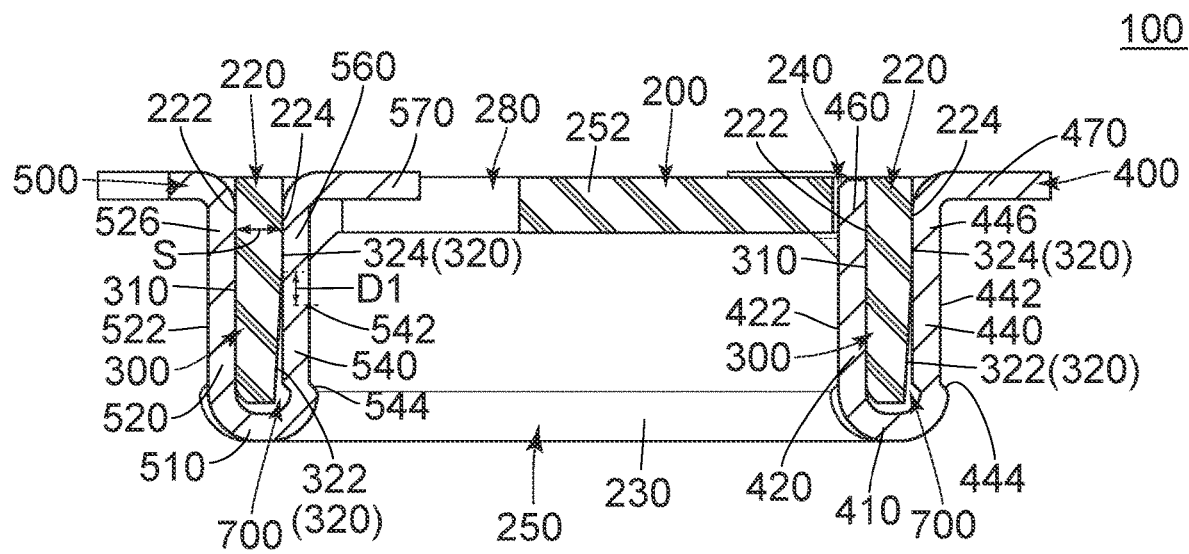
FIG. 14 is a cross-sectional view showing the connector of FIG. 12, taken along line E-E.

As shown in FIGS. 13 and 14, the first side portion 310 of the present embodiment intersects with the width direction. More specifically, the first side portion 310 is perpendicular to the width direction. The first side portion 310 extends in the up-down direction.

As shown in FIGS. 13 and 14, the second side portion 320 of the present embodiment intersects with the width direction. The second side portion 320 extends in the up-down direction.

As shown in FIGS. 13 and 14, in each of the interposing portions 300, an orientation of the width direction, in which the second side portion 320 faces, is opposite to an orientation of the width direction in which the first side portion 310 faces. In neighboring two of the interposing portions 300 in the pitch direction, an orientation of the width direction, in which the first side portion 310 of one of the two interposing portions 300 faces, is opposite to an orientation of the width direction in which the first side portion 310 of a remaining one of the two interposing portions 300 faces. In neighboring two of the interposing portions 300 in the pitch direction, an orientation of the width direction, in which the second side portion 320 of one of the two interposing portions 300 faces, is opposite to an orientation of the width direction in which the second side portion 320 of a remaining one of the two interposing portions 300 faces.

As shown in FIG. 17, the second side portion 320 has an allowance portion 322 and a restriction portion 324.

As shown in FIGS. 13 and 14, the allowance portion 322 of the present embodiment intersects with the up-down direction. The allowance portion 322 intersects with the width direction. More specifically, the allowance portion 322 is oblique to both the up-down direction and the width direction. The allowance portion 322 is positioned below the restriction portion 324 in the up-down direction. The allowance portion 322 defines a lower end of the interposing portion 300 in the up-down direction.

As shown in FIGS. 13 and 14, the restriction portion 324 of the present embodiment intersects with the width direction. More specifically, the restriction portion 324 is perpendicular to the width direction. The restriction portion 324 is positioned above the allowance portion 322 in the up-down direction.

As shown in FIG. 17, the first side portions 310 and the second side portions 320 are alternately arranged in the pitch direction on the first wall surface 222. As shown in FIG. 16, the first side portions 310 and the second side portions 320 are alternately arranged in the pitch direction on the second wall surface 224.

As shown in FIG. 11, each of the short wall portions 230 of the present embodiment defines an outer end of the housing 200 in the pitch direction. As shown in FIGS. 8 and 11, each of the short wall portions 230 has a height in the up-down direction and extends in the width direction. Each of the short wall portions 230 couples the two long wall portions 220 with each other in the width direction.

As shown in FIG. 8, the island-like portion accommodating portion 250 of the present embodiment is a recess which is recessed upward in the up-down direction. Specifically, the island-like portion accommodating portion 250 has an upper surface 252. The upper surface 252 defines an upper end of the island-like portion accommodating portion 250.

As shown in FIG. 15, the housing 200 is formed with a plurality of holes 240 each of which pierces the housing 200 in the up-down direction.

As shown in FIG. 13, each of the holes 240 of the present embodiment is provided in the island-like portion accommodating portion 250. As shown in FIG. 15, each of the holes 240 pierces the upper surface 252 of the island-like portion accommodating portion 250 in the up-down direction.

As shown in FIG. 15, the housing 200 is formed with a plurality of elongated holes 280.

As shown in FIG. 15, each of the elongated holes 280 of the present embodiment pierces the upper surface 252 of the island-like portion accommodating portion 250 in the up-down direction. As shown in FIG. 11, each of the elongated holes 280 is provided in the island-like portion accommodating portion 250. As shown in FIG. 15, each of the elongated holes 280 has a closed periphery in the plane perpendicular to the up-down direction. Each of the elongated holes 280 has a second holding portion 282.

As shown in FIG. 15, the second holding portion 282 of the present embodiment is positioned at an outer end of the elongated hole 280 in the width direction. The second holding portion 282 consists of two ditches which face each other in the pitch direction. As described above, the elongated hole 280, at which the second holding portion 282 is provided, has the closed periphery in the plane perpendicular to the up-down direction. Accordingly, inner ends in the width direction of the two ditches, which form the second holding portion 282, are coupled with each other by the closed periphery of the elongated hole 280.

As shown in FIG. 11, the terminals 400, 500 of the present embodiment are arranged in the pitch direction. More specifically, the terminals 400, 500 are arranged in two rows, namely, a front row and a rear row, in the width direction, and the terminals 400, 500 of each row are arranged in the pitch direction. The two rows of the terminals 400, 500 correspond to the two long wall portions 220, respectively. As understood from FIGS. 21 and 25, the terminals 400, 500 include first terminals 400 and second terminals 500, and the first terminal 400 and the second terminal 500 have shapes different from each other.

Figure 18:
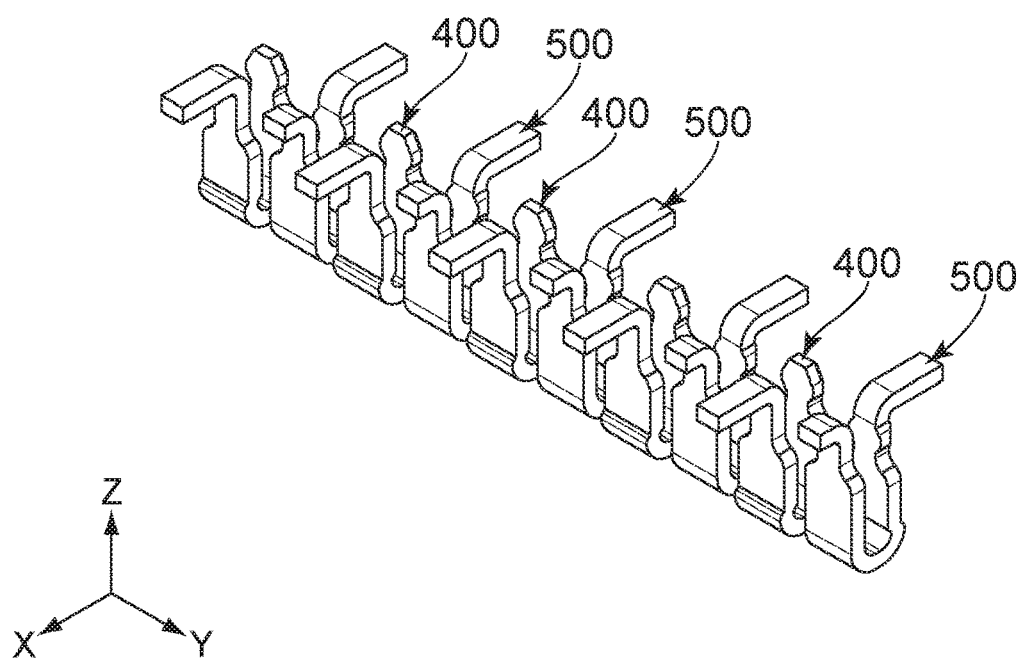
FIG. 18 is a perspective view showing one of terminal rows which are included in the connector of FIG. 7.

As shown in FIG. 18, in each row, the first terminals 400 and the second terminals 500 are alternately arranged in the pitch direction. In other words, the first terminal 400 and the second terminal 500 are adjacent to each other in the pitch direction.

As shown in FIG. 11, in the two rows of the terminals 400, 500, the first terminals 400 of the present embodiment are arranged in a staggered configuration. Each of the first terminals 400 is attached to the housing 200. Each of the first terminals 400 is attached to the long wall portion 220.

Figure 21:
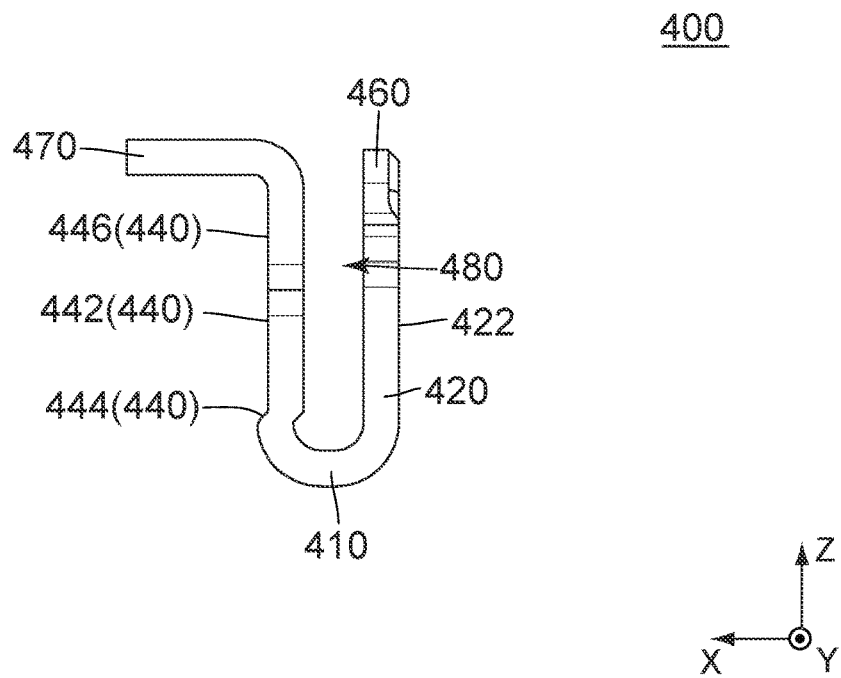
FIG. 21 is a side view showing the first terminal of FIG. 19.

As shown in FIG. 21, each of the first terminals 400 has an insertion end portion 410, a first extending portion 420 and a second extending portion 440. Specifically, each of the first extending portion 420 and the second extending portion 440 extends in the up-down direction from the insertion end portion 410.

As shown in FIG. 21, the insertion end portion 410 of the present embodiment has a U-like shape. Specifically, the insertion end portion 410 has the U-like shape when the first terminal 400 is viewed along the pitch direction. The insertion end portion 410 defines a lower end of the first terminal 400 in the up-down direction. As shown in FIG. 13, the allowance portion 322 is nearer to the insertion end portion 410 than the restriction portion 324 in the up-down direction. A lower end of the interposing portion 300 is in no contact with the insertion end portion 410. Specifically, a lower end of the allowance portion 322 is in no contact with the insertion end portion 410.

As shown in FIG. 21, the first extending portion 420 of the present embodiment extends in the up-down direction from the insertion end portion 410. Specifically, the first extending portion 420 extends upward in the up-down direction from the insertion end portion 410. As shown in FIG. 13, the first side portion 310 faces the first extending portion 420 in the width direction. The first side portion 310 is in contact with the first extending portion 420. Specifically, the first side portion 310 is in contact with the first extending portion 420 in the width direction.

As shown in FIG. 21, the first extending portion 420 is provided with a first contact point 422. It is noted that the first extending portion 420 is provided with no lock portion.

Figure 5:
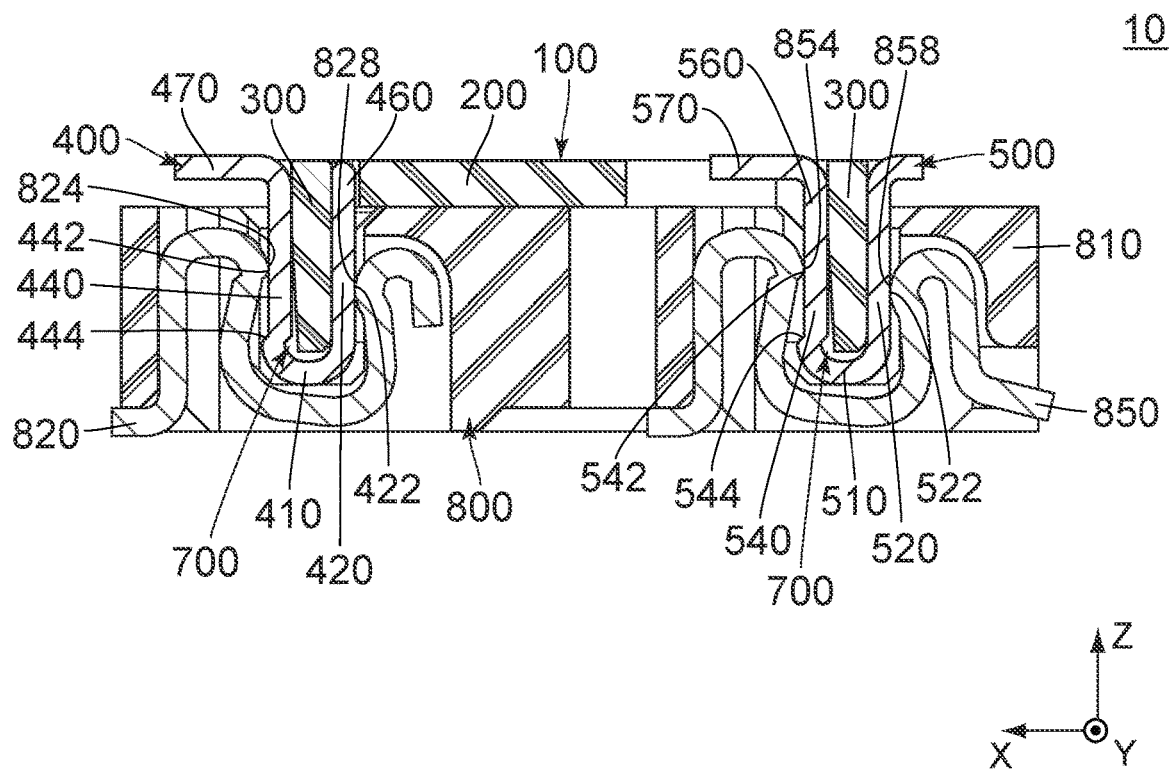
FIG. 5 is a cross-sectional view showing the connector assembly of FIG. 4, taken along line A-A.
Figure 6:
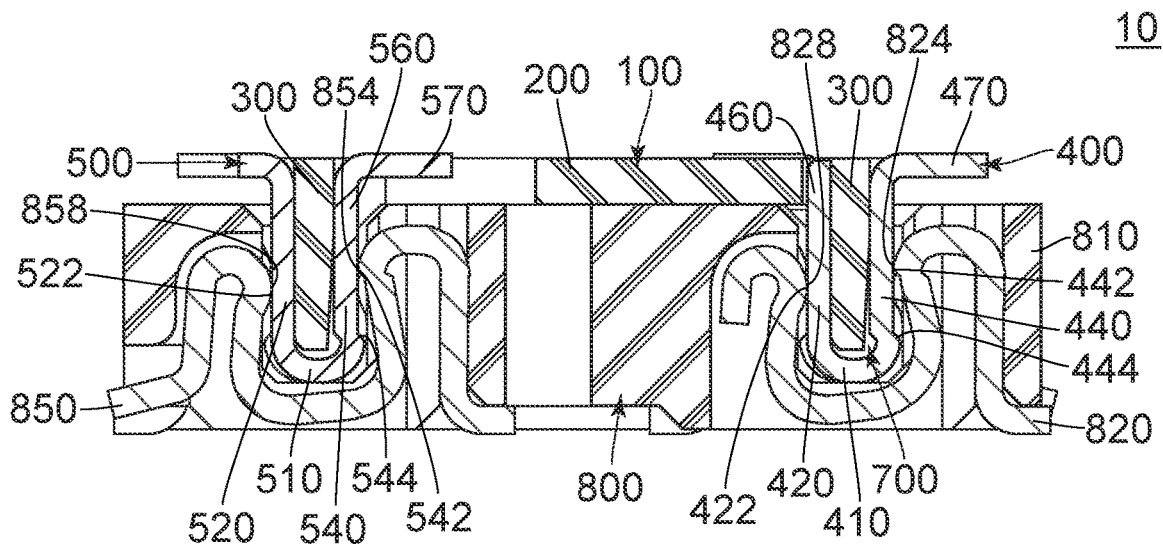
FIG. 6 is a cross-sectional view showing the connector assembly of FIG. 4, taken along line B-B.

As shown in FIGS. 13 and 14, the first contact point 422 of the present embodiment faces inward in the width direction. As shown in FIGS. 5 and 6, the first contact point 422 is brought into contact with the mating terminal 820 when the connector 100 is mated with the mating connector 800. Specifically, the first contact point 422 is brought into contact with the main contact point 828 when the connector 100 is mated with the mating connector 800.

As shown in FIG. 21, the second extending portion 440 of the present embodiment extends in the up-down direction from the insertion end portion 410. Specifically, the second extending portion 440 extends upward in the up-down direction from the insertion end portion 410. The first extending portion 420 is positioned inward of the second extending portion 440 in the width direction. As shown in FIG. 13, the second side portion 320 faces the second extending portion 440 in the width direction. A part of the second side portion 320 is in contact with a part of the second extending portion 440 in the width direction.

As shown in FIG. 13, the interposing portion 300 is positioned between the first extending portion 420 and the second extending portion 440 in the width direction.

As shown in FIG. 13, the connector 100 has gaps 700 each of which is positioned between the allowance portion 322 and the second extending portion 440 in the width direction. In other words, the allowance portion 322 is spaced away from the second extending portion 440 in the width direction. The allowance portion 322 allows partial movement of the second extending portion 440 into the gap 700. Referring to FIGS. 5 and 13, this provides the following advantage: at the beginning of the mating of the connector 100 with the mating connector 800, the second extending portion 440 is partially resiliently deformed toward the allowance portion 322, and the insertion end portion 410 is moved toward the first extending portion 420, and thereby the insertion end portion 410 can easily ride over the support contact point 824. Thus, the connector 100 requires a reduced insertion force upon the mating of the connector 100 with the mating connector 800.

In the connector 900 of Patent Document 1, the extending portion 923 is slightly spaced away from the housing 910, and a distance between the extending portion 923 and the housing 910 might have a manufacturing variation. Accordingly, the connector 900 of Patent Document 1 has a drawback that it is difficult for the second contact point 926 to make electrical contact with the mating terminal 970 as designed under a mated state where the connector 900 and the mating connector 950 are mated with each other.

In contrast, as shown in FIG. 13, the connector 100 of the present embodiment is configured so that the restriction portion 324 is in contact with the second extending portion 440 in the width direction without any gap and thereby restricts movement of the second extending portion 440 in the width direction. Referring to FIGS. 5 and 13, this enables a second contact point 442 to be positioned relative to the mating terminal 820 with a high degree of accuracy under the mated state where the connector 100 and the mating connector 800 are mated with each other. Thus, dissimilar to the connector 900 of patent Document 1, the connector 100 of the present embodiment enables the second contact point 442 to make electrical contact with the mating terminal 820 as designed under the mated state where the connector 100 is mated with and the mating connector 800.

As shown in FIG. 21, the second extending portion 440 is provided with the second contact point 442.

Figure 19:
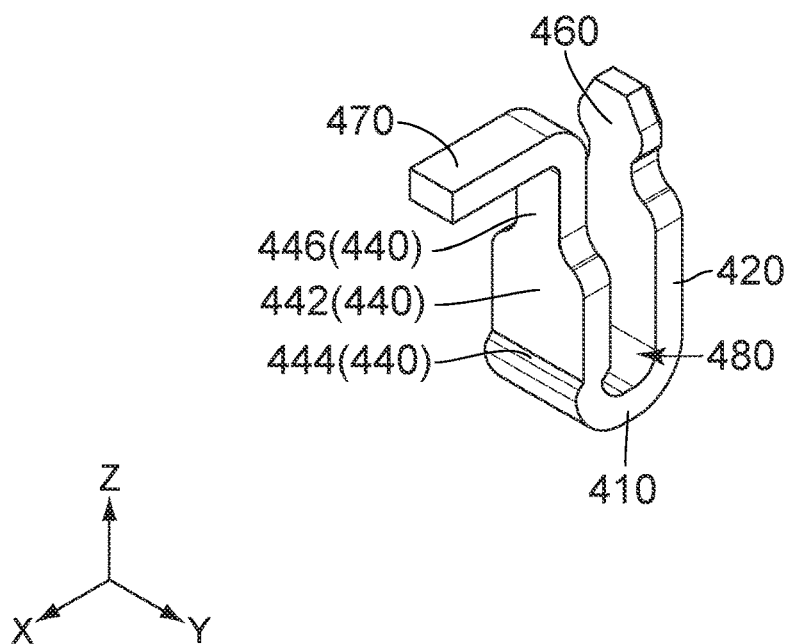
FIG. 19 is a perspective view showing a first terminal which is included in the terminal row of FIG. 18.
Figure 20:
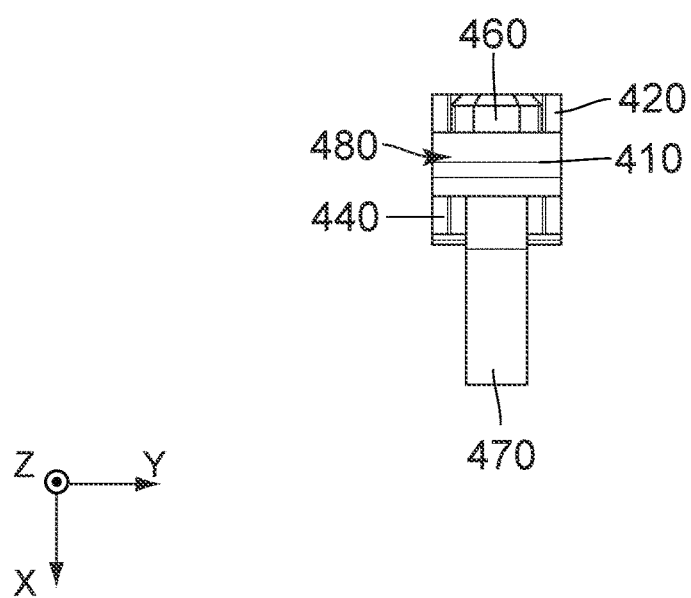
FIG. 20 is a top view showing the first terminal of FIG. 19.

As shown in FIG. 19, the second contact point 442 of the present embodiment faces outward in the width direction. As shown in FIG. 5, the second contact point 442 is brought into contact with the mating terminal 820 when the connector 100 is mated with the mating connector 800. Specifically, the second contact point 442 is brought into contact with the support contact point 824 when the connector 100 is mated with the mating connector 800. As shown in FIG. 13, a position of the second contact point 442 does not overlap with the restriction portion 324 in the up-down direction.

Referring to FIGS. 13 and 30, the terminal 400 has a part which corresponds to the restriction portion 324, and a distance D1 on the terminal 400 from the part to the second contact point 442 is shorter than a distance D2 on the mating terminal 820 from the mating restricted portion 822 to the support contact point 824. Accordingly, referring to FIG. 5, upon completion of the mating of the connector 100 with the mating connector 800, moving of the second contact point 442 is more difficult than moving of the support contact point 824, and thereby the second contact point 442 of the first terminal 400 of the connector 100 can be positioned relative to the mating first terminal 820 of the mating connector 800 with a higher degree of accuracy. Thus, the connector 100 of the present embodiment enables the second contact point 442 to further make electrical contact with the mating terminal 820 as designed under the mated state where the connector 100 is mated with and the mating connector 800.

As shown in FIG. 19, the second extending portion 440 is provided with a lock portion 444.

As described above, the second extending portion 440 is provided with the lock portion 444 while the first extending portion 420 is provided with no lock portion. However, the present invention is not limited thereto. Specifically, the first terminal 400 may be modified so that the first extending portion 420 is provided with a lock portion while the second extending portion 440 is provided with no lock portion. Alternatively, the first terminal 400 may be modified so that the first extending portion 420 is provided with a lock portion while the second extending portion 440 is provided with the lock portion 444.

Referring to FIG. 5, the lock portion 444 of the present embodiment locks the mating of the connector 100 with the mating connector 800 when the connector 100 is mated with the mating connector 800. More specifically, referring to FIGS. 5 and 30, the lock portion 444 and the mating lock portion 827 lock the mating when the connector 100 and the mating connector 800 are mated with each other.

As shown in FIG. 19, the second extending portion 440 has a pressing portion 446.

As shown in FIG. 19, the pressing portion 446 of the present embodiment is positioned at an upper end of the second extending portion 440. The pressing portion 446 is positioned around an upper end of the first terminal 400. As shown in FIG. 13, the pressing portion 446 is positioned at a position same as a position of the restriction portion 324 in the up-down direction. The pressing portion 446 is in contact with the restriction portion 324 in the width direction. The pressing portion 446 is positioned above the allowance portion 322 in the up-down direction.

As shown in FIG. 21, each of the first terminals 400 of the present embodiment has a first press-fit portion 460.

As shown in FIG. 21, the first press-fit portion 460 of the present embodiment is provided at an end portion of the first extending portion 420. More specifically, the first press-fit portion 460 is positioned at an upper end of the first extending portion 420 in the up-down direction. A part of the pressing portion 446 is positioned below the first press-fit portion 460 in the up-down direction. As shown in FIG. 13, a part of the restriction portion 324 is positioned below the first press-fit portion 460 in the up-down direction. The first press-fit portions 460 of the first terminals 400 are press-fit into the holes 240, respectively. Specifically, the first press-fit portion 460 of the first terminal 400 of each row is press-fit into the hole 240 which is provided inward of the corresponding long wall portion 220 in the width direction.

As shown in FIG. 21, each of the first terminals 400 has a first mounting portion 470.

As shown in FIG. 21, the first mounting portion 470 of the present embodiment extends from the second extending portion 440. Specifically, the first mounting portion 470 extends outward in the width direction from the second extending portion 440. The first mounting portion 470 defines an outer end of the first terminal 400 in the width direction. The first mounting portion 470 defines the upper end of the first terminal 400 in the up-down direction. Referring to FIG. 8, the first mounting portion 470 is soldered to the pad of the circuit board 750 when the connector 100 is mounted on the circuit board 750.

As shown in FIG. 21, each of the first terminals 400 has an interposing portion accommodating portion 480.

As shown in FIG. 21, the interposing portion accommodating portion 480 of the present embodiment is positioned between the first extending portion 420 and the second extending portion 440 in the width direction. The interposing portion accommodating portion 480 is positioned above the insertion end portion 410 in the up-down direction. As understood from FIGS. 13 and 21, the interposing portion 300 is accommodated in the interposing portion accommodating portion 480 under a state where the first terminal 400 is attached to the housing 200.

Figure 22:
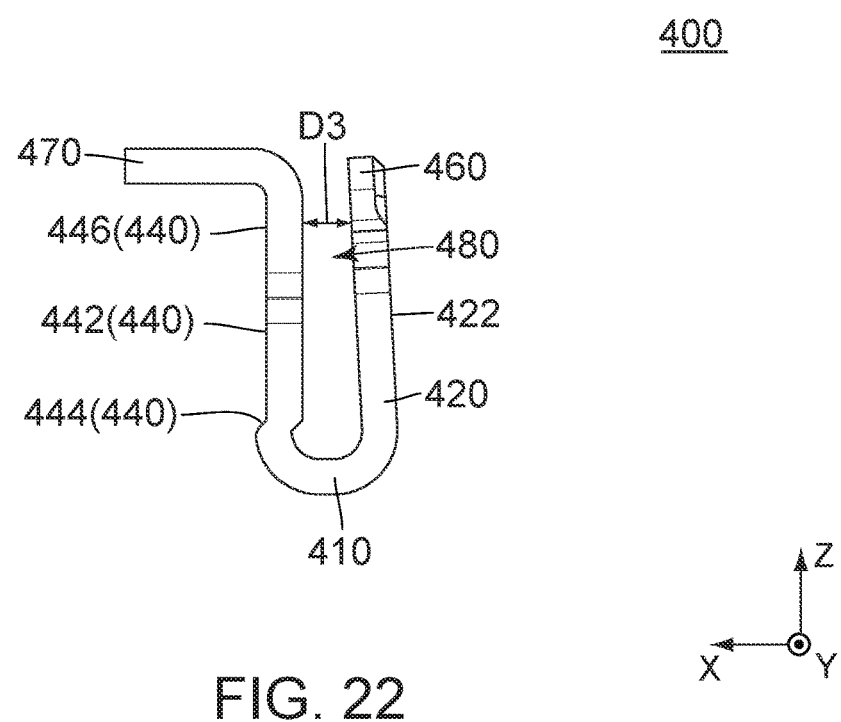
FIG. 22 is another side view showing the first terminal of FIG. 19. In the figure, the first terminal is in a state before being attached to the housing.
Figure 23:
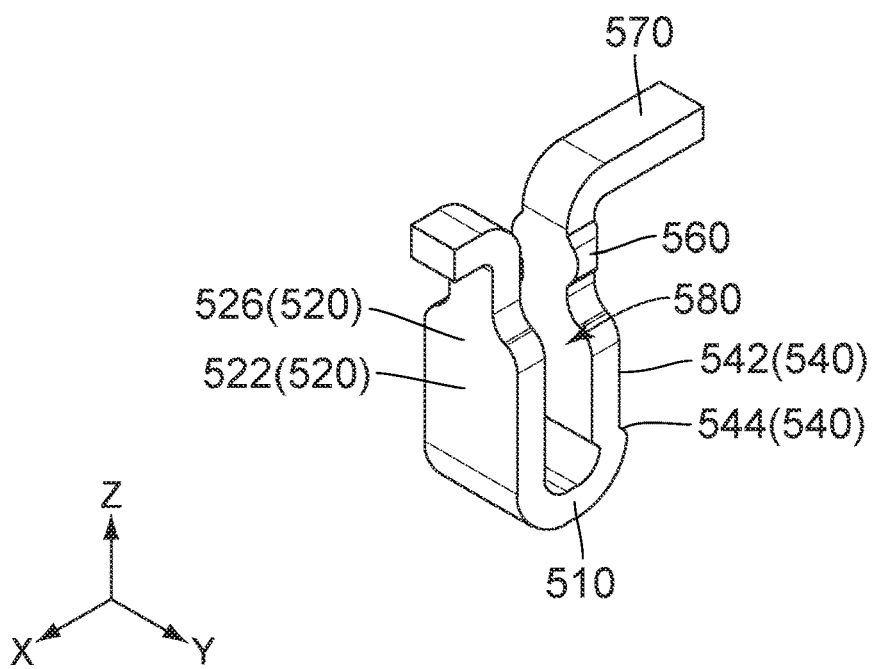
FIG. 23 is a perspective view showing a second terminal which is included in the terminal row of FIG. 18.
Figure 24:
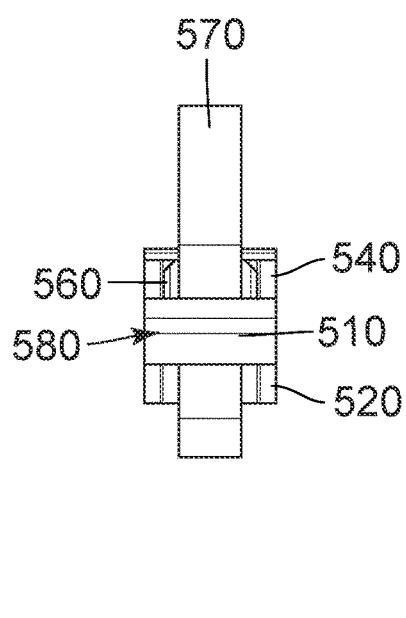
FIG. 24 is a top view showing the second terminal of FIG. 23.

Referring to FIGS. 13 and 22, a distance D3 between the first press-fit portion 460 and the pressing portion 446 in the width direction in a state before the first terminal 400 is attached to the housing 200 is smaller than a size S of the interposing portion 300 in the width direction. Thus, referring to FIGS. 13, 21 and 22, upon the attachment of the first terminal 400 to the housing 200, the interposing portion 300 is accommodated in the interposing portion accommodating portion 480 of the first terminal 400 while the distance D3 between the first press-fit portion 460 and the pressing portion 446 in the width direction is increased. Additionally, referring to FIGS. 13, 21 and 22, the pressing portion 446 is brought into pressure contact with the restriction portion 324 under the state where the first terminal 400 is attached to the housing 200.

As shown in FIG. 11, in the two rows of the terminals 400, 500, the second terminals 500 of the present embodiment are arranged in a staggered configuration. Each of the second terminals 500 is attached to the housing 200. Each of the second terminals 500 is attached to the long wall portion 220.

Figure 25:
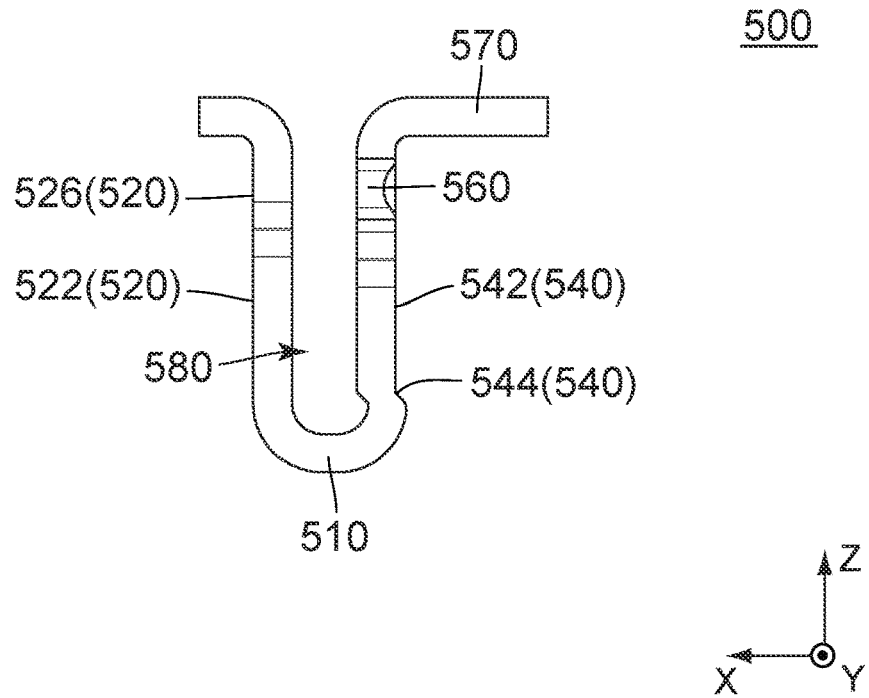
FIG. 25 is a side view showing the second terminal of FIG. 23.

As shown in FIG. 25, each of the second terminals 500 has an insertion end portion 510, a first extending portion 520 and a second extending portion 540. Specifically, each of the first extending portion 520 and the second extending portion 540 extends in the up-down direction from the insertion end portion 510.

As shown in FIG. 25, the insertion end portion 410 of the present embodiment has a U-like shape. Specifically, the insertion end portion 510 has the U-like shape when the second terminal 500 is viewed along the pitch direction. The insertion end portion 510 defines a lower end of the second terminal 500 in the up-down direction. As shown in FIG. 14, the allowance portion 322 is nearer to the insertion end portion 510 than the restriction portion 324 in the up-down direction. A lower end of the interposing portion 300 is in no contact with the insertion end portion 510. Specifically, a lower end of the allowance portion 322 is in no contact with the insertion end portion 510.

As shown in FIG. 25, the first extending portion 520 of the present embodiment extends in the up-down direction from the insertion end portion 510. Specifically, the first extending portion 520 extends upward in the up-down direction from the insertion end portion 510. As shown in FIG. 14, the first side portion 310 faces the first extending portion 520 in the width direction. The first side portion 310 is in contact with the first extending portion 520. Specifically, the first side portion 310 is in contact with the first extending portion 520 in the width direction.

Figure 12:
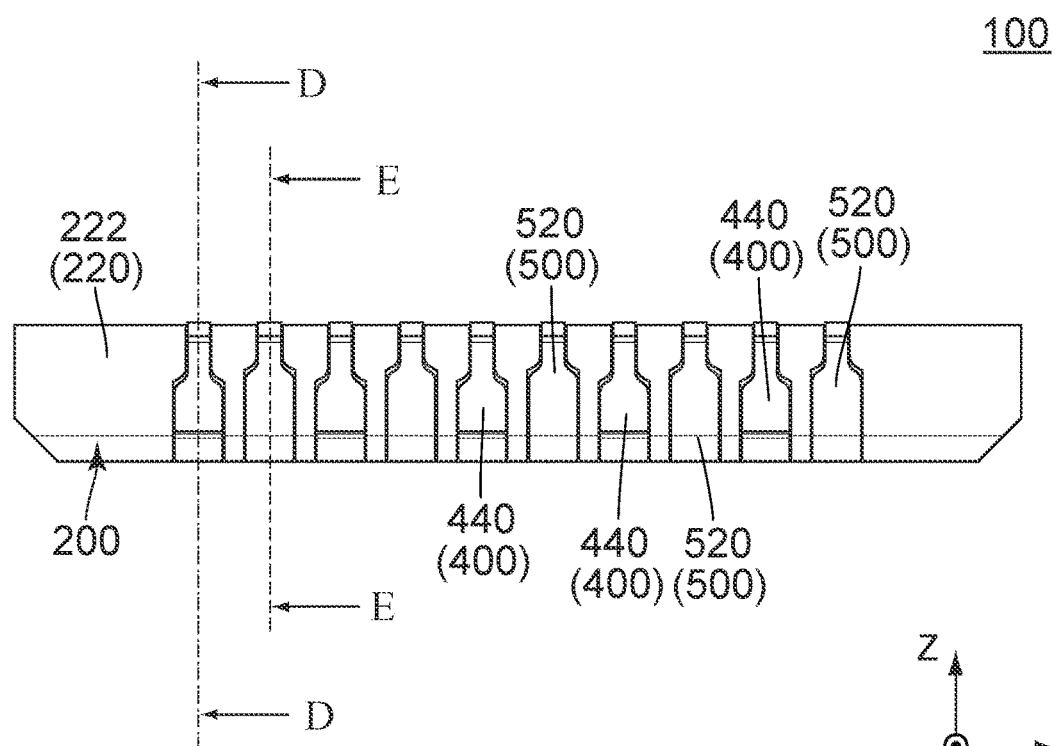
FIG. 12 is a front view showing the connector of FIG. 7.

As shown in FIG. 12, the first extending portions 520 and the second extending portions 440 are alternately arranged in the pitch direction on the first wall surface 222.

As shown in FIG. 25, the first extending portion 520 is provided with a first contact point 522. It is noted that the first extending portion 520 is provided with no lock portion.

As shown in FIGS. 13 and 14, the first contact point 522 of the present embodiment faces outward in the width direction. As shown in FIGS. 5 and 6, the first contact point 522 is brought into contact with the mating terminal 850 when the connector 100 is mated with the mating connector 800. Specifically, the first contact point 522 is brought into contact with the main contact point 858 when the connector 100 is mated with the mating connector 800.

As shown in FIG. 25, the second extending portion 540 of the present embodiment extends in the up-down direction from the insertion end portion 510. Specifically, the second extending portion 540 extends upward in the up-down direction from the insertion end portion 510. The second extending portion 540 is positioned inward of the first extending portion 520 in the width direction. As shown in FIG. 14, the second side portion 320 faces the second extending portion 540 in the width direction. A part of the second side portion 320 is in contact with a part of the second extending portion 540 in the width direction.

As shown in FIG. 14, the interposing portion 300 is positioned between the first extending portion 520 and the second extending portion 540 in the width direction.

As shown in FIG. 14, the connector 100 has gaps 700 each of which is positioned between the allowance portion 322 and the second extending portion 540 in the width direction. In other words, the allowance portion 322 is spaced away from the second extending portion 540 in the width direction. The allowance portion 322 allows partial movement of the second extending portion 540 into the gap 700. Referring to FIGS. 6 and 14, this provides the following advantage: at the beginning of the mating of the connector 100 with the mating connector 800, the second extending portion 540 is partially resiliently deformed toward the allowance portion 322, and the insertion end portion 510 is moved toward the first extending portion 520, and thereby the insertion end portion 510 can easily ride over the support contact point 854. Thus, the connector 100 requires the reduced insertion force upon the mating of the connector 100 with the mating connector 800.

As shown in FIG. 14, the connector 100 of the present embodiment is configured so that the restriction portion 324 is in contact with the second extending portion 540 in the width direction without any gap and thereby restricts movement of the second extending portion 540 in the width direction. Referring to FIGS. 6 and 14, this enables a second contact point 542 to be positioned relative to the mating terminal 850 with a high degree of accuracy under the mated state where the connector 100 and the mating connector 800 are mated with each other. Thus, dissimilar to the connector 900 of patent Document 1, the connector 100 of the present embodiment enables the second contact point 542 to make electrical contact with the mating terminal 850 as designed under the mated state where the connector 100 is mated with and the mating connector 800.

Figure 10:
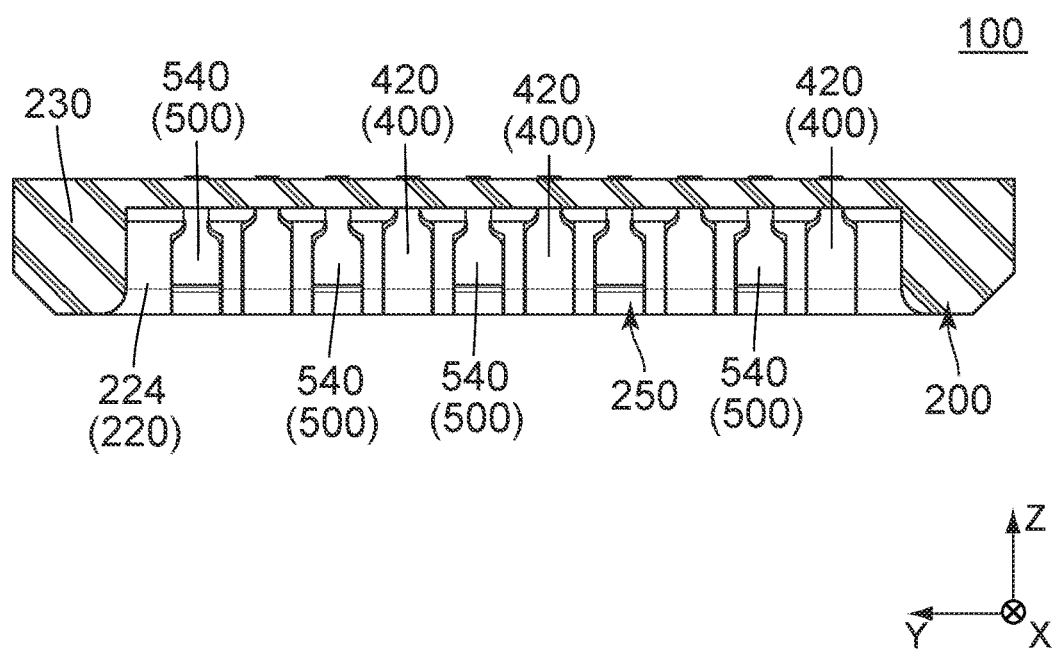
FIG. 10 is a cross-sectional view showing the connector of FIG. 9, taken along line C-C.

As shown in FIG. 10, the first extending portions 420 and the second extending portions 540 are alternately arranged in the pitch direction on the second wall surface 224.

As shown in FIG. 25, the second extending portion 540 is provided with the second contact point 542.

As shown in FIG. 14, the second contact point 542 of the present embodiment faces inward in the width direction. As shown in FIG. 6, the second contact point 542 is brought into contact with the mating terminal 850 when the connector 100 is mated with the mating connector 800. Specifically, the second contact point 542 is brought into contact with the support contact point 854 when the connector 100 is mated with the mating connector 800. As shown in FIG. 14, a position of the second contact point 542 does not overlap with the restriction portion 324 in the up-down direction.

Referring to FIGS. 14 and 31, the terminal 500 has a part which corresponds to the restriction portion 324, and a distance D1 on the terminal 500 from the part to the second contact point 542 is shorter than a distance D2 on the mating terminal 850 from the mating restricted portion 852 to the support contact point 854. Accordingly, referring to FIG. 6, upon the completion of the mating of the connector 100 with the mating connector 800, moving of the second contact point 542 is more difficult than moving of the support contact point 854, and thereby the second contact point 542 of the second terminal 500 of the connector 100 can be positioned relative to the mating second terminal 850 of the mating connector 800 with a higher degree of accuracy. Thus, the connector 100 of the present embodiment enables the second contact point 542 to further make electrical contact with the mating terminal 850 as designed under the mated state where the connector 100 is mated with and the mating connector 800.

As shown in FIG. 25, the second extending portion 540 is provided with a lock portion 544.

As described above, the second extending portion 540 is provided with the lock portion 544 while the first extending portion 520 is provided with no lock portion. However, the present invention is not limited thereto. Specifically, the second terminal 500 may be modified so that the first extending portion 520 is provided with a lock portion while the second extending portion 540 is provided with no lock portion. Alternatively, the second terminal 500 may be modified so that the first extending portion 520 is provided with a lock portion while the second extending portion 540 is provided with the lock portion 544.

Referring to FIG. 6, the lock portion 544 of the present embodiment locks the mating of the connector 100 with the mating connector 800 when the connector 100 is mated with the mating connector 800. More specifically, referring to FIGS. 6 and 31, the lock portion 544 and the mating lock portion 857 lock the mating when the connector 100 and the mating connector 800 are mated with each other.

As shown in FIG. 25, the first extending portion 520 has a pressing portion 526.

As shown in FIG. 25, the pressing portion 526 of the present embodiment is positioned at an upper end of the first extending portion 520. The pressing portion 526 is positioned around an upper end of the second terminal 500. As shown in FIG. 14, the pressing portion 526 is positioned at a position same as a position of the restriction portion 324 in the up-down direction. The pressing portion 526 is positioned above the allowance portion 322 in the up-down direction. The pressing portion 526 is in contact with the first side portion 310 in the width direction.

As shown in FIG. 25, each of the second terminals 500 of the present embodiment has a second press-fit portion 560.

As shown in FIG. 25, the second press-fit portion 560 of the present embodiment is provided on the second extending portion 540. More specifically, the second press-fit portion 560 is positioned at an upper end of the second extending portion 540 in the up-down direction. A part of the pressing portion 526 is positioned below the second press-fit portion 560 in the up-down direction. As shown in FIG. 14, a part of the restriction portion 324 is positioned below the second press-fit portion 560 in the up-down direction.

Referring to FIGS. 14 and 15, the second press-fit portion 560 is press-fit into the second holding portion 282. Specifically, the second press-fit portion 560 of the second terminal 500 of each row is press-fit into the second holding portion 282 which is provided inward of the corresponding long wall portion 220 in the width direction.

As described above, the inner ends in the width direction of the two ditches, which form the second holding portion 282, are coupled with each other by the closed periphery of the elongated hole 280. This prevents increase of a distance between the inner ends, in the width direction, of the two ditches of the second holding portion 282 in the pitch direction when the second press-fit portion 560 is press-fit into the second holding portion 282. Thus, the second holding portion 282 keeps holding the second press-fit portion 560.

As described above, the first terminal 400 of the present embodiment is configured so that the first press-fit portion 460 is provided at the first extending portion 420 which is positioned inward of the second extending portion 440 in the width direction, and the second terminal 500 of the present embodiment is configured so that the second press-fit portion 560 is provided at the second extending portion 540 which is positioned inward of the first extending portion 520 in the width direction. This can simplify an attachment process of the terminal 400, 500 to the housing 200 for the manufacturing of the connector 100 of the present embodiment as follows: a manufacturer forms a blank which is configured so that an outer end in the width direction of each of the first terminals 400 and the second terminals 500 is connected with a carrier via a connection portion under a state where the first terminals 400 and the second terminals 500 are alternately arranged in the pitch direction; the first terminals 400 and the second terminals 500, which are coupled with one another by the carrier, are simultaneously attached to the housing 200; and each of the first terminals 400 and the second terminals 500 is separated from the carrier by splitting the connection portion, which connects the terminal 400, 500 with the carrier, into two parts.

As shown in FIG. 25, each of the second terminals 500 has a second mounting portion 570.

As shown in FIG. 25, the second mounting portion 570 of the present embodiment extends from the second extending portion 540. Specifically, the second mounting portion 570 extends inward in the width direction from the second extending portion 540. The second mounting portion 570 defines an inner end of the second terminal 500 in the width direction. The second mounting portion 570 defines the upper end of the second terminal 500 in the up-down direction. Referring to FIGS. 8 and 14, the second mounting portion 570 is soldered to the pad of the circuit board 750 when the connector 100 is mounted on the circuit board 750.

As shown in FIG. 25, each of the second terminals 500 has an interposing portion accommodating portion 580.

As shown in FIG. 25, the interposing portion accommodating portion 580 of the present embodiment is positioned between the first extending portion 520 and the second extending portion 540 in the width direction. The interposing portion accommodating portion 580 is positioned above the insertion end portion 510 in the up-down direction. As understood from FIGS. 14 and 25, the interposing portion 300 is accommodated in the interposing portion accommodating portion 580 under a state where the second terminal 500 is attached to the housing 200.

Figure 26:
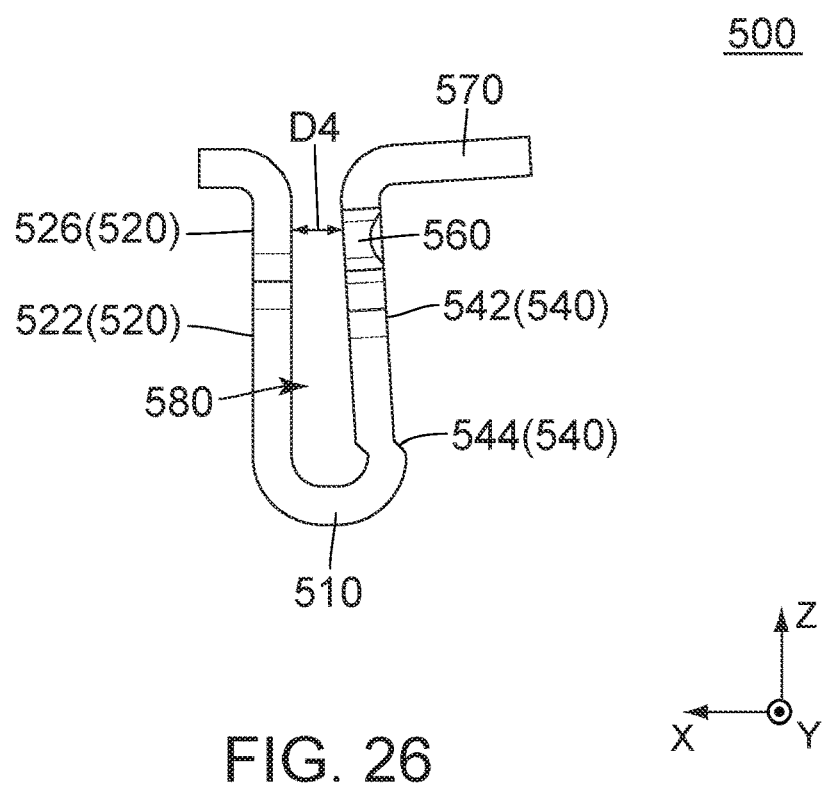
FIG. 26 is another side view showing the second terminal of FIG. 23. In the figure, the second terminal is in a state before being attached to the housing.

Referring to FIGS. 14 and 26, a distance D4 between the second press-fit portion 560 and the pressing portion 526 in the width direction in a state before the second terminal 500 is attached to the housing 200 is smaller than the size S of the interposing portion 300 in the width direction. Thus, referring to FIGS. 14, 25 and 26, upon the attachment of the second terminal 500 to the housing 200, the interposing portion 300 is accommodated in the interposing portion accommodating portion 580 of the second terminal 500 while enlarging the distance D4 between the second press-fit portion 560 and the pressing portion 526 in the width direction. Additionally, referring to FIGS. 14, 25 and 26, the pressing portion 526 is brought into pressure contact with the first side portion 310 under the state where the second terminal 500 is attached to the housing 200.

Referring to FIGS. 13 and 14, the first press-fit portion 460 and the second press-fit portion 560 are positioned so that they correspond to each other in the width direction, and the first press-fit portions 460 and the second press-fit portions 560 are alternately arranged in the pitch direction.

Although the specific explanation about the present invention is made above referring to the embodiments, the present invention is not limited thereto and is susceptible to various modifications and alternative forms.

Although the connector 100 of the aforementioned embodiment is configured so that the first press-fit portion 460 is provided at the end portion of the first extending portion 420 while the first press-fit portion 460 of the first terminal 400 of each row is press-fit into the hole 240 which is provided inward of the corresponding long wall portion 220 in the width direction, the present invention is not limited thereto. Specifically, the connector 100 may be modified as follows: the first press-fit portion 460 is provided at an end portion of the second extending portion 440; and the first press-fit portion 460 of the first terminal 400 of each row is held by a holding portion which is provided outward of the corresponding long wall portion 220 in the width direction.

Although the connector 100 of the aforementioned embodiment is configured so that the second press-fit portion 560 is provided at the second extending portion 540 while the second press-fit portion 560 of the second terminal 500 of each row is press-fit into the second holding portion 282 which is provided inward of the corresponding long wall portion 220 in the width direction, the present invention is not limited thereto. Specifically, the connector 100 may be modified as follows: the second press-fit portion 560 is provided at the first extending portion 520; and the second press-fit portion 560 of the second terminal 500 of each row is held by a holding portion which is provided outward of the corresponding long wall portion 220 in the width direction.

Although the first mounting portion 470 of the aforementioned embodiment extends outward in the width direction from the second extending portion 440, the present invention is not limited thereto. Specifically, the first mounting portion 470 may extend inward in the width direction from the first extending portion 420. As described above, the second extending portion 440 is provided with the lock portion 444. In addition, a force, which is directed in an orientation away from the circuit board 750, is applied to the lock portion 444 from the mating lock portion 827 in a specific case where the connector 100 mounted on the circuit board 750 is removed from the mating connector 800. However, in the specific case, the first mounting portion 470 of the present embodiment can keep the first terminal 400 firmly fixed on the circuit board 750 against the force, which is applied to the lock portion 444, because the first mounting portion 470 fixed on the circuit board 750 extends from the second extending portion 440. Thus, the first mounting portion 470 of the present embodiment is more preferable.

Although the second mounting portion 570 of the aforementioned embodiment extends inward in the width direction from the second extending portion 540, the present invention is not limited thereto. Specifically, the second mounting portion 570 may extend outward in the width direction from the first extending portion 520. As described above, the second extending portion 540 is provided with the lock portion 544. In addition, a force, which is directed in the orientation away from the circuit board 750, is applied to the lock portion 544 from the mating lock portion 857 in the specific case. However, in the specific case, the second mounting portion 570 of the present embodiment can keep the second terminal 500 firmly fixed on the circuit board 750 against the force, which is applied to the lock portion 544, because the second mounting portion 570 fixed on the circuit board 750 extends from the second extending portion 540. Thus, the second mounting portion 570 of the present embodiment is more preferable.

Although the first terminal 400 of the aforementioned embodiment is configured so that the position of the second contact point 442 does not overlap with the restriction portion 324 in the up-down direction, the present invention is not limited thereto. Specifically, the connector 100 may be modified so that the position of the second contact point 442 overlaps with the restriction portion 324 in the up-down direction. By this modification, moving of the second contact point 442 relative to the interposing portion 300 is more difficult. Thus, upon completion of mating of the modified connector 100 with the mating connector 800, the second contact point 442 of the first terminal 400 of the modified connector 100 can be positioned relative to the mating first terminal 820 of the mating connector 800 with a further higher degree of accuracy, and a designed contact force between the mating terminal 820 and the second contact point 442 is more easily obtained.

Although the second terminal 500 of the aforementioned embodiment is configured so that the position of the second contact point 542 does not overlap with the restriction portion 324 in the up-down direction, the present invention is not limited thereto. Specifically, the connector 100 may be modified so that the position of the second contact point 542 overlaps with the restriction portion 324 in the up-down direction. By this modification, moving of the second contact point 542 relative to the interposing portion 300 is more difficult. Thus, upon completion of mating of the modified connector 100 with the mating connector 800, the second contact point 542 of the second terminal 500 of the modified connector 100 can be positioned relative to the mating second terminal 850 of the mating connector 800 with a further higher degree of accuracy, and a designed contact force between the mating terminal 850 and the second contact point 542 is more easily obtained.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector mateable in an up-down direction with a mating connector which has a mating terminal, wherein:
the connector comprises a plurality of terminals and a housing;
the housing holds the terminals;
the housing has an interposing portion extending in the up-down direction;
the interposing portion has a first side portion and a second side portion in a width direction perpendicular to the up-down direction;
each of the terminals has an insertion end portion, a first extending portion, and a second extending portion;
the insertion end portion has a U-like shape;
each of the first extending portion and the second extending portion extends in the up-down direction from the insertion end portion;
the interposing portion is positioned between the first extending portion and the second extending portion in the width direction;
the first extending portion includes a first contact point;
the first contact point is brought into contact with the mating terminal when the connector is mated with the mating connector;
the second extending portion includes a second contact point;
the second contact point is brought into contact with the mating terminal when the connector is mated with the mating connector;
the first side portion is in contact with the first extending portion;
the second side portion has an allowance portion and a restriction portion;
the allowance portion is nearer to the insertion end portion than the restriction portion in the up-down direction;
the connector has a gap between the allowance portion and the second extending portion in the width direction;
the allowance portion allows partial movement of the second extending portion into the gap; and
the restriction portion is in contact with the second extending portion in the width direction without any gap and thereby restricts movement of the second extending portion in the width direction.

2. The connector as recited in claim 1, wherein:
the mating connector comprises a plurality of the mating terminals and a mating housing;
the mating housing holds the mating terminals;
each of the mating terminals has a support contact point, a supporting portion, and a main contact point;
the supporting portion extends from the support contact point and is at least partially resiliently deformable;
the main contact point is supported by the supporting portion;
the first contact point is brought into contact with the main contact point when the connector is mated with the mating connector; and
the second contact point is brought into contact with the support contact point when the connector is mated with the mating connector.

3. The connector as recited in claim 1, wherein:
the housing has a long wall portion;
the long wall portion has a height in the up-down direction;
the long wall portion extends in a pitch direction perpendicular to both the up-down direction and the width direction;
the long wall portion includes a plurality of the interposing portions which are arranged in the pitch direction;
the long wall portion has a first wall surface and a second wall surface in the width direction;
in each of the first wall surface and the second wall surface, the first side portions and the second side portions are alternately arranged in the pitch direction;
the terminals are arranged in the pitch direction;
the first extending portions and the second extending portions are alternately arranged in the pitch direction on the first wall surface; and
the first extending portions and the second extending portions are alternately arranged in the pitch direction on the second wall surface.

4. The connector as recited in claim 3, wherein:
the terminals include first terminals and second terminals;
the first terminal and the second terminal have shapes different from each other;
the first terminals and the second terminals are alternately arranged in the pitch direction;
each of the first terminals has a first press-fit portion;
each of the second terminals has a second press-fit portion;
the first press-fit portion and the second press-fit portion are positioned so that the first press-fit portion and the second press-fit portion correspond to each other in the width direction; and
the first press-fit portions and the second press-fit portions are alternately arranged in the pitch direction.

5. The connector as recited in claim 4, wherein:
each of the first terminals has a first mounting portion which extends from the second extending portion;
the first extending portion has an end portion;
the first press-fit portion is provided at the end portion of the first extending portion;
each of the second terminals has a second mounting portion which extends from the second extending portion;
the second press-fit portion is provided at the second extending portion;
the housing is formed with a plurality of holes;
each of the holes pierces the housing in the up-down direction; and
the first press-fit portions are press-fit into the holes, respectively.

6. The connector as recited in claim 1, wherein:
the second extending portion includes a lock portion; and
the lock portion locks a mating of the connector with the mating connector when the connector is mated with the mating connector.

7. The connector as recited in claim 1, wherein a position of the second contact point overlaps with the restriction portion in the up-down direction.

8. A connector assembly comprising the connector as recited in claim 1 and the mating connector which is mateable with the connector in the up-down direction, wherein:
the mating connector comprises a plurality of the mating terminals and a mating housing;
the mating housing holds the mating terminals;
each of the mating terminals has a mating restricted portion, a coupling portion, a support contact point, a supporting portion, and a main contact point;
movement of the mating restricted portion in the width direction is restricted by the mating housing;
the coupling portion extends from the mating restricted portion;

the support contact point is supported by the coupling portion;

the supporting portion extends from the support contact point and is at least partially resiliently deformable;

the main contact point is supported by the supporting portion;

the first contact point is brought into contact with the main contact point when the connector is mated with the mating connector; and the second contact point is brought into contact with the support contact point when the connector is mated with the mating connector.

9. The connector assembly as recited in claim 8, wherein:

the terminal has a part which corresponds to the restriction portion; and a distance on the terminal from the part to the second contact point is shorter than a distance on the mating terminal from the mating restricted portion to the support contact point.

\* \* \* \* \*